(12) United States Patent
Dajaku

(10) Patent No.: US 12,633,786 B2
(45) Date of Patent: May 19, 2026

(54) ELECTRICAL MACHINE AND METHOD FOR OPERATING THE ELECTRICAL MACHINE

(71) Applicant: FEAAM GmbH, Neubiberg (DE)

(72) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 290 days.

(21) Appl. No.: 17/290,221

(22) PCT Filed: Oct. 25, 2019

(86) PCT No.: PCT/EP2019/079264
§ 371 (c)(1),
(2) Date: Apr. 29, 2021

(87) PCT Pub. No.: WO2020/089110
PCT Pub. Date: May 7, 2020

(65) Prior Publication Data
US 2021/0384781 A1 Dec. 9, 2021

(30) Foreign Application Priority Data

Oct. 30, 2018 (DE) ..................... 10 2018 127 127.1

(51) Int. Cl.
*H02K 1/274* (2022.01)
*H02K 1/24* (2006.01)
*H02K 1/278* (2022.01)

(52) U.S. Cl.
CPC ............... *H02K 1/274* (2013.01); *H02K 1/24* (2013.01); *H02K 1/278* (2013.01)

(58) Field of Classification Search
CPC ............ H02K 1/274; H02K 1/24; H02K 1/27; H02K 1/2706; H02K 1/272; H02K 1/2726;
(Continued)

(56) References Cited

U.S. PATENT DOCUMENTS 2,545,062 A * 3/1951 Whittington ........... A43B 17/08
36/43
5,130,595 A * 7/1992 Arora ....................... H02K 1/24
(Continued)

FOREIGN PATENT DOCUMENTS

CN 104638862 A 5/2015
CN 105703583 A 6/2016
(Continued)

OTHER PUBLICATIONS

IP NPL Search.*
(Continued)

*Primary Examiner* — Christopher M Koehler
*Assistant Examiner* — Ahmed F Seck
(74) *Attorney, Agent, or Firm* — Morgan, Lewis & Bockius LLP

(57) ABSTRACT

An electrical machine (20) having a stator (21) and a rotor (22) mounted rotatable with respect to the stator (21) is provided. The rotor (22) comprises at least one magnetic pole pair that has two magnets (23). Further, the rotor (22) comprises at least two recesses (25) that extend at least partially through the rotor (22), the recesses (25) being arranged at opposite sides of the rotor (22), and the number of magnetic pole pairs of the rotor (22) being different from the number of electromagnetic pole pairs able to be generated during operation of the rotor (22). Further disclosed is a method of operating the electrical machine (20).

19 Claims, 16 Drawing Sheets

(58) Field of Classification Search
    CPC .. H02K 1/2733; H02K 1/2753; H02K 1/2787;
            H02K 1/2789; H02K 1/2795; H02K
            1/223; H02K 21/042; H02K 1/2773;
            H02K 1/26; H02K 1/265; H02K 1/2766
    USPC .............................. 310/181, 156.55, 156.56
    See application file for complete search history.

(56)                    References Cited

U.S. PATENT DOCUMENTS 5,753,989  A  *  5/1998  Syverson  ............... H02K 1/276
                                                          322/29
     6,072,257  A  *  6/2000  Akemakou  .......... H02K 21/042
                                                       310/156.55
     6,271,613  B1 *  8/2001  Akemakou  .......... H02K 21/042
                                                          310/181
     6,520,248  B2 *  2/2003  Gailus  ................. H01L 23/3677
                                                          165/185
     8,829,758  B2 *  9/2014  Takizawa  ............. H02K 1/2773
                                                       310/156.55
  2002/0053850  A1 *  5/2002  Shah  .................... H02K 21/042
                                                          310/166
  2006/0103253  A1 *  5/2006  Shiga  .................... H02K 15/03
                                                          310/43
  2010/0327787  A1 *  12/2010  Sakai  ..................... H02P 21/22
                                                       318/400.09
  2011/0074231  A1 *  3/2011  Soderberg  ................ H01F 3/10
                                                          335/297
  2017/0098987  A1 *  4/2017  Gieras  .................... H02K 21/14
  2018/0212502  A1 *  7/2018  Finkle  ................... H02K 1/223

2019/0036399  A1 *  1/2019  Yamada  .................. H02K 3/28
  2020/0136485  A1 *  4/2020  Sadeghi  ................. H02K 1/278
  2022/0323742  A1 *  10/2022  Grauwinkel  .......... A61M 60/13

FOREIGN PATENT DOCUMENTS

CN         105763009  A      7/2016
  CN         108880038  A      11/2018
  DE          69933250  T2      9/2007
  DE       102007025971  A1     12/2008
  DE       102008044276  A1      6/2010
  DE       112015001725  T5      1/2017
  DE       112016003276  T5      4/2018
  EP          2019472  A1 *     1/2009  .......... H02K 21/042
  JP        2011-067048  A2      3/2011
  WO      WO 2009026767  A1 *    3/2009  .......... H02K 21/042

OTHER PUBLICATIONS

EP_2019472_-_Translation.pdf (Year: 2024).*
WO_2009026767_A1_-_Translation.pdf (Year: 2024).*
Hutterer, P. et al., "Enhanced sensorless controllability of PMSM—A
novel rotor asymmetry approach", IECON 2011—37th Annual
Conference on IEEE Industrial Electronics Society, IEEE, 7. Nov.
2011 (Nov. 7, 2011), pp. 1842-1847, XP032085075, DOI: 10.1109/
IECON.2011.6119586 ISBN: 978-1-61284-969-0 Illustration 12.
Office Action and Search Report in Chinese Application No.
201980079213.9, dated Apr. 24, 2025, 14 pages including transla-
tion.
Office Action in German Application No. 102018010381.2, dated
Jul. 11, 2025, 5 pages.

* cited by examiner

FIG 5A
FIG 5B
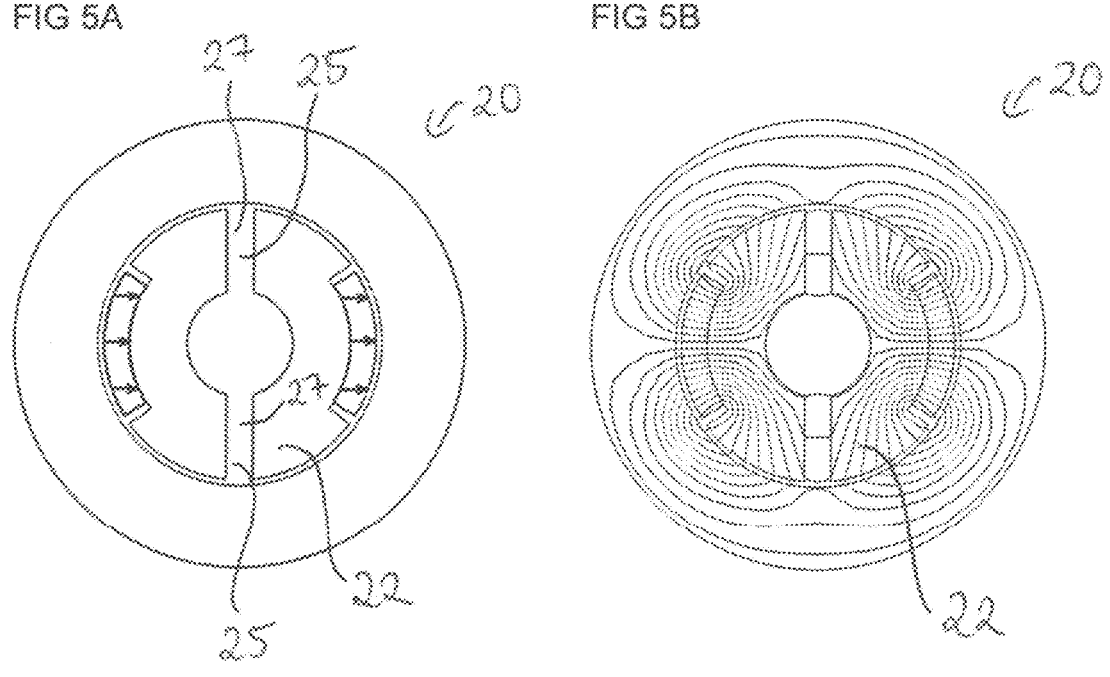
FIG 6A
FIG 6B
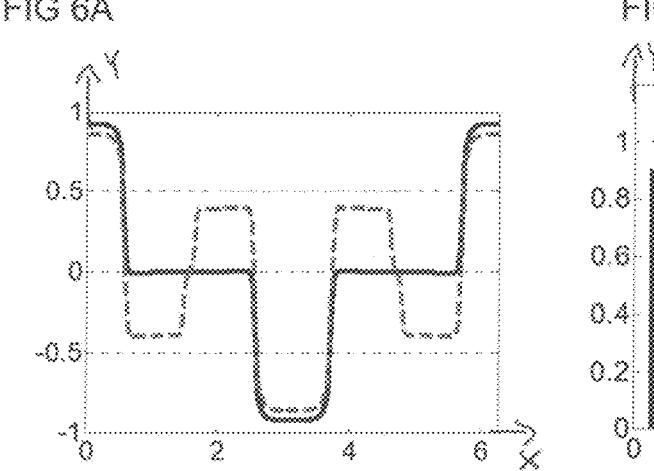
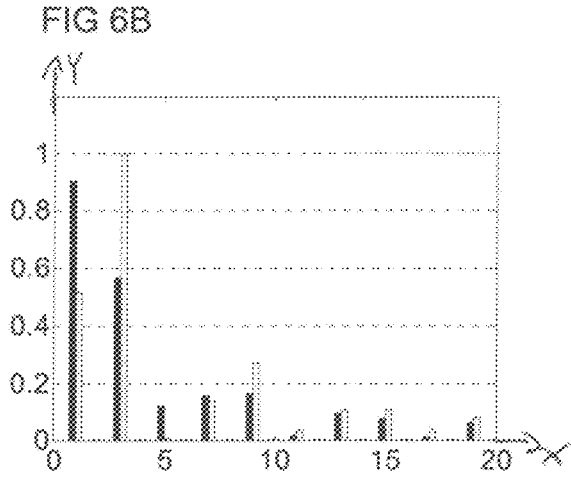

FIG 7A
FIG 7B
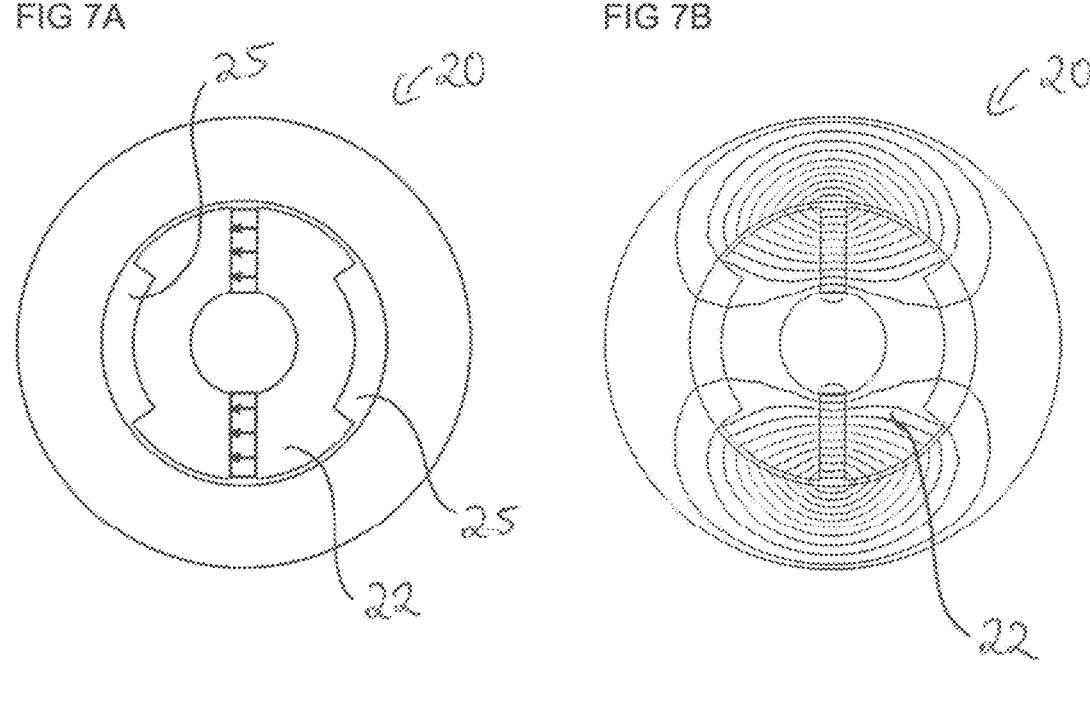
FIG 8A
FIG 8B
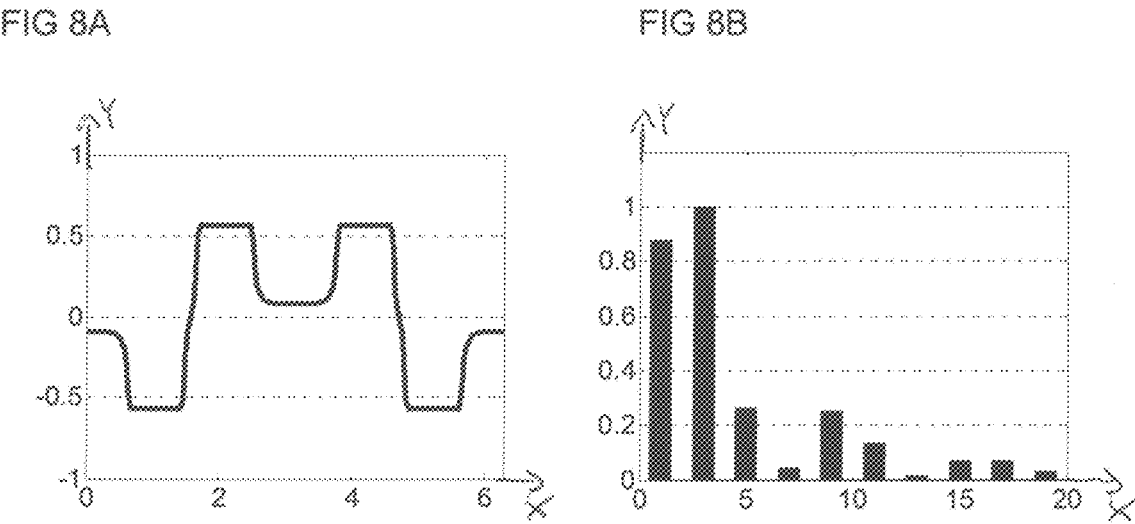

FIG 9
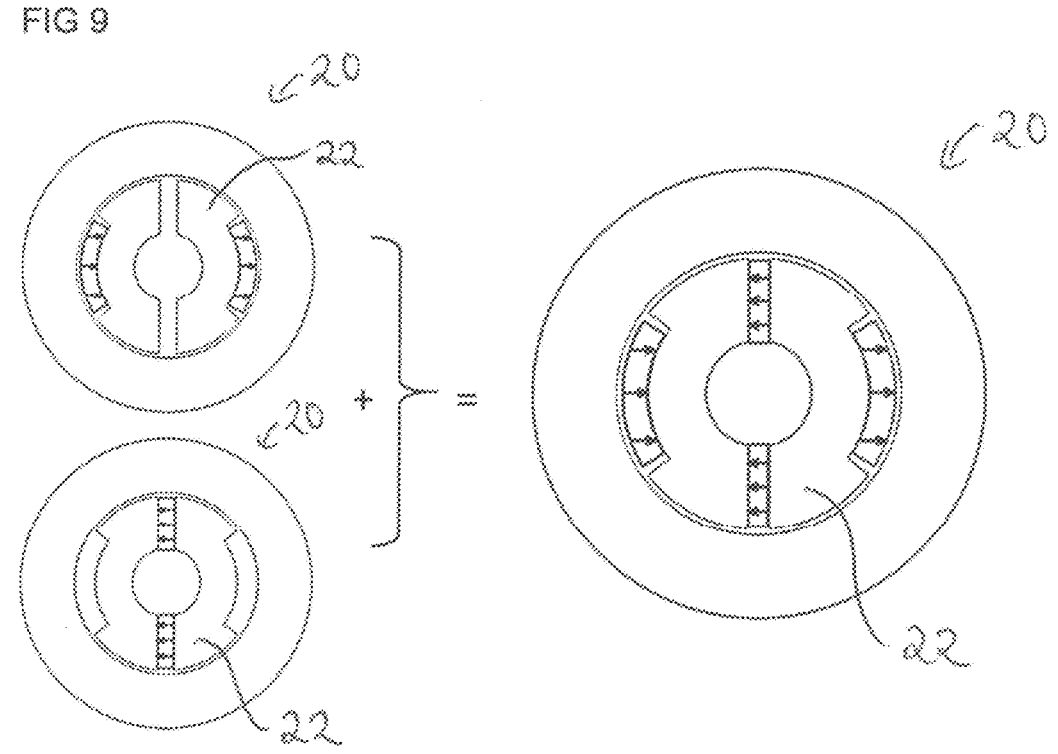
FIG 10A
FIG 10B
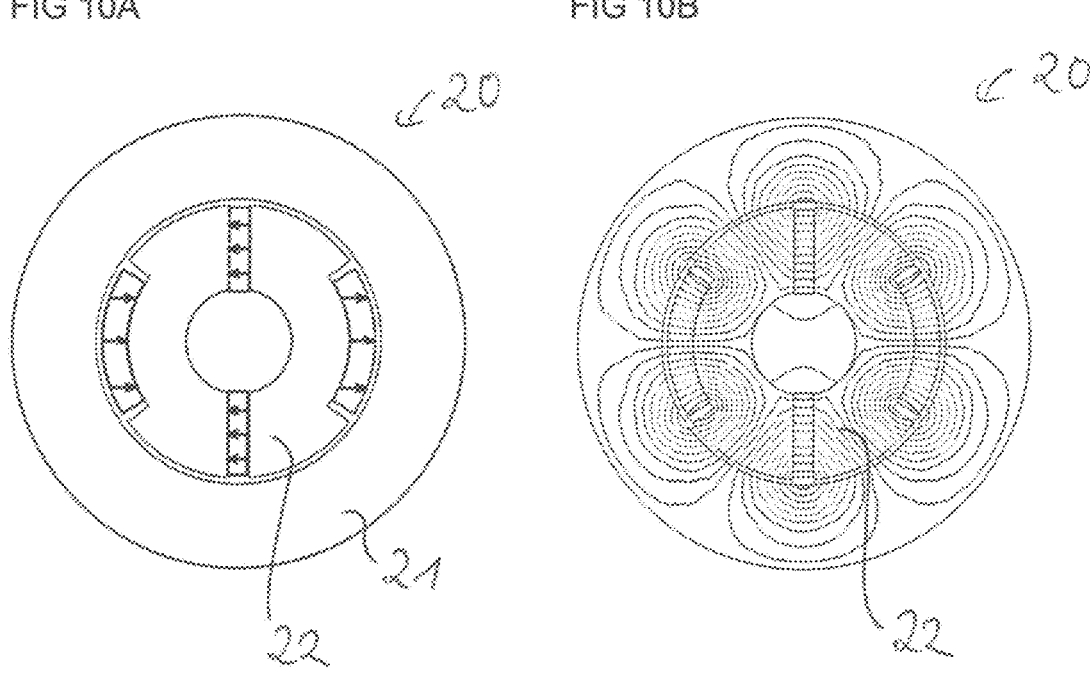

ELECTRICAL MACHINE AND METHOD FOR OPERATING THE ELECTRICAL MACHINE

The present application relates to an electrical machine and a method of operating the electrical machine.

Typically, electrical machines comprise a stator and a rotor movable relative thereto. Electrical machines may be operated as a motor or as a generator, converting electrical energy into kinetic energy or vice versa. In operation, a magnetic field of the rotor interacts with a magnetic field of the stator.

To generate a rotor magnetic field, the rotor may have permanent magnets. The advantage of using permanent magnets is that there are many different ways to arrange the permanent magnets in the rotor, which is why there are more ways to optimize the efficiency of the electrical machine.

However, the permanent magnets usually make up a large proportion of the total cost of the electrical machine.

One problem to be solved is to provide an electrical machine which can be operated efficiently. Another problem to be solved is to provide an efficient method for operating the electrical machine.

The tasks are solved by the objects of the independent patent claims. Advantageous embodiments and further developments are indicated in the dependent claims.

According to at least one embodiment of the electrical machine, the electrical machine comprises a stator and a rotor mounted rotatable with respect to the stator. The stator may comprise a stator winding. For this purpose, the stator may have slots in which the stator winding is arranged. The stator winding may be connected to power electronics and designed to generate a rotating field. The rotor may be an internal rotor or an external rotor. If the rotor is an internal rotor, an outer surface of the rotor faces the stator. The rotor may be arranged on a shaft. In addition, the rotor has an axis of rotation. An air gap may be present between the stator and the rotor.

The rotor has at least one magnetic pole pair comprising two magnets. The magnets may be permanent magnets or electromagnets. The two magnets may be arranged at opposite sides of the rotor. The magnets may be arranged in the rotor. Alternatively, it is possible that the magnets are arranged on the outside of the rotor. The magnets each have a magnetic axis. The magnetic axis extends parallel to the magnetization direction of the magnets. This means that the magnetic axis connects the two poles of each magnet. The magnetic axis of the magnets can point in the same direction.

The rotor has at least two recesses which extend at least partially through the rotor. The recesses may be cavities in the rotor.

The rotor may have a rotor core, which comprises a core material. The magnets may be disposed on or in the rotor core. The two recesses are free of the core material. The core material may be iron.

The recesses can extend in cross-section through the rotor from the outer surface of the rotor toward the center of the rotor. This means that the recesses can be directly adjacent to the air gap. The cross-section through the rotor extends in a plane which is perpendicular to the axis of rotation of the rotor. However, it is also possible for the recesses to be located entirely within the rotor. The recesses may extend equally far through the rotor. For example, the recesses extend partially through the rotor core. It is further possible that the recesses extend completely through the rotor. This may mean that the recesses extend up to the shaft on which the rotor is arranged. Further, the recesses may have the same geometric shape. For example, the recesses have the shape of a rectangle as seen in cross-section.

The recesses are arranged at opposite sides of the rotor. This can mean that the two recesses are arranged so as to be offset by 180° to each other along the circumference of the rotor. Further, the recesses have the same main direction of extension.

The number of the magnetic pole pairs of the rotor is different from the number of the electromagnetic pole pairs able to be generated during operation of the rotor. The magnetic pole pairs of a rotor are pole pairs of magnets. This means that a magnetic pole pair is formed by two magnets. The two magnets of each pole pair can be arranged at opposite sides of the rotor. If the rotor has two magnets, for example, the rotor as a whole has one magnetic pole pair. The electromagnetic pole pairs able to be generated during operation of the rotor are, among other things, the electromagnetic pole pairs used during operation of the electrical machine to generate torque. The electromagnetic pole pairs are the pole pairs of the rotor magnetic field, which interacts with the magnetic field of the stator during operation. The number of the magnetic pole pairs of a rotor and the number of the electromagnetic pole pairs of a rotor may differ if a component of the magnetomotive force of the rotor with an order greater than 1 is used to generate torque. The magnetomotive force of the rotor may have components of different harmonic orders. Another expression for the magnetomotive force is the field excitation curve.

For example, if the component of the magnetomotive force of the rotor with an order of 3 has a non-zero magnetic flux density, this component can be used for torque generation. In this case, the rotor has six electromagnetic poles or three electromagnetic pole pairs. To generate the six electromagnetic poles, only one magnetic pole pair is needed in the rotor. Thus, the number of the magnetic pole pairs of the rotor is different from the number of the electromagnetic pole pairs able to be generated during operation of the rotor. In other words, the magnetic field of the rotor interacting with a magnetic field of the stator has six electromagnetic poles.

The magnetic flux density of the harmonic components of the magnetomotive force of the rotor depends, among other things, on the geometrical extension of the magnets of the rotor. For example, two magnets of the rotor may be arranged along the circumference of the rotor. In this case, the flux density of the harmonic components of the magnetomotive force of the rotor depends on the size of the angular range over which the magnets extend in each case. In this context, the angular range is measured in a cross-section through the rotor from the center of the rotor. In addition, the flux density of the harmonic components of the magnetomotive force of the rotor may be affected by the introduction of non-magnetic material into the rotor.

The electrical machine described herein is based, among other things, on the idea that the magnets and the recesses of the rotor are arranged such that the flux density of a component of the magnetomotive force of the rotor having an order greater than 1 is greater than the flux density of the fundamental wave of the magnetomotive force of the rotor. Furthermore, the electrical machine described herein is based, among other things, on the idea that the rotor is constructed such that the flux density of a component of the magnetomotive force of the rotor having an order greater than 1 is greater than the flux density of the fundamental wave of the magnetomotive force of the rotor.

It is advantageous that the number of the magnetic pole pairs of the rotor is different from the number of electromagnetic pole pairs that can be generated during operation of the rotor, since the number of magnets required can thus be reduced. If the magnets of the rotor are permanent magnets, they contribute significantly to the cost of the rotor. By reducing the number of the magnets required or by reducing the size of the magnets of the rotor, the cost of the rotor can be substantially reduced. It has been shown that a rotor described herein, with a lower total mass of permanent magnets of the rotor than a rotor in which the number of the magnetic pole pairs is equal to the number of the electro-magnetic pole pairs, can be operated at a similar magnetic flux density. The torque of an electrical machine is directly dependent on the magnetic flux density.

According to at least one embodiment of the electrical machine, the number of the magnetic pole pairs of the rotor is smaller than the number of the electromagnetic pole pairs able to be generated during operation of the rotor. This can be achieved by utilizing a component of the magnetomotive force of the rotor with an order greater than 1 for torque generation. Advantageously, this means that fewer magnetic pole pairs are required as a whole and thus fewer magnets in the rotor. This can reduce the manufacturing costs of the electrical machine.

According to at least one embodiment of the electrical machine, the magnets are permanent magnets. This means that the magnets comprise a magnetic material. The magnets may have the shape of a cuboid. In a cross-section through the rotor along a plane perpendicular to the axis of rotation, the magnets may have the shape of a rectangle. Alternatively, the magnets may have a curved shape as seen in a cross-section through the rotor. For example, the magnets extend in places along the circumference of the rotor. The magnets each have a magnetic axis. The magnetic axis is parallel to the direction of magnetization of the magnets. That is, the magnetic axis connects the two poles of each magnet. The use of permanent magnets in the rotor is advantageous because there are many possibilities for the arrangement of the permanent magnets and the shaping of the permanent magnets, so there are many different ways to improve the efficiency of the electrical machine.

According to at least one embodiment of the electrical machine, the magnetic axis of the magnets, as seen in a cross-section through the rotor, extends perpendicular to a radial direction. The cross-section through the rotor extends in a plane that is perpendicular to the axis of rotation of the rotor. The magnetic axes of the magnets may extend along the same direction, as seen in the cross-section through the rotor. Alternatively, it is possible for the magnetic axes of the magnets to extend in opposite directions. In each case, the radial direction extends, as seen in cross-section through the rotor, from the center of the rotor to the respective magnet. The magnetic axis of the magnets may run perpendicular to the main direction of extension of the magnets, as seen in cross-section through the rotor.

Advantageously, if the magnetic axis of the magnets is perpendicular to a radial direction, as seen in a cross-section through the rotor, a component or components of the mag-netomotive force of the rotor that is used to generate torque can be amplified, and components or a component of the magnetomotive force that is not used to generate torque can be suppressed. As a result, the electrical machine can be operated efficiently.

According to at least one embodiment of the electrical machine, the rotor comprises at least one further magnetic pole pair comprising two further magnets. The further magnets may be permanent magnets or electromagnets. The two further magnets may be arranged at opposite sides of the rotor. The further magnets may be arranged in the rotor. The further magnets may each be arranged in a recess in the rotor. Alternatively, it is possible for the further magnets to be arranged on the outside of the rotor. The magnetic axis of the further magnets may point in the same direction. The further magnets may be arranged along the circumference of the rotor. For example, the further magnets have the shape of a segment of a circle or a curved shape.

The electrical machine described herein is based, inter alia, on the idea that the magnets, the recesses and the further magnets of the rotor are arranged in such a way that the flux density of a component of the magnetomotive force of the rotor with an order greater than 1 is greater than the flux density of the fundamental wave of the magnetomotive force of the rotor. Since the further magnets may be arranged along the circumference of the rotor, the flux density of the harmonic components of the magnetomotive force of the rotor depends on the size of the angular range over which the further magnets extend in each case. Thus, the arrangement of the magnets and of the further magnets in the rotor as described herein can increase the efficiency of the electrical machine.

According to at least one embodiment of the electrical machine, the further magnets are permanent magnets. That is, the further magnets comprise a magnetic material. The further magnets may have the shape of a cuboid. In a cross-section through the rotor along a plane perpendicular to the axis of rotation, the further magnets may have the shape of a rectangle. Alternatively, the further magnets may have a curved shape, as seen in a cross-section through the rotor. For example, the further magnets extend in places along the circumference of the rotor. The further magnets each have a magnetic axis. The magnetic axis connects the two poles of each further magnet. The use of permanent magnets in the rotor is advantageous because there are many possibilities for the arrangement of the permanent magnets and the shaping of the permanent magnets, so that there are many different possibilities for improving the efficiency of the electrical machine.

According to at least one embodiment of the electrical machine, the further magnetic pole pair is formed by at least one electromagnet. This can mean that the further magnets are each formed by an electrical conductor. During operation of the electrical machine, the electrical conductors are supplied with current by a power supply. The electrical conductors can each be arranged in a recess in the rotor. The recesses may be adjacent to the air gap. It is further possible that the recesses are arranged completely within the rotor. The electrical conductors may each comprise an electrically conductive material. For example, the electrical conductors are each formed by a rod or a wire. It is further possible that the electromagnet is a coil. In this case, one or more windings of the coil may be arranged in the recesses. The two electrical conductors of the further magnetic pole pair may be arranged at opposite sides of the rotor. This can mean that the two electrical conductors of the further magnetic pole pair are arranged so as to be 180° offset from each other along the circumference of the rotor. Alternatively, it is possible that the two electrical conductors of the further magnetic pole pair are arranged offset with respect to each other by less than 180° along the circumference of the rotor. For example, the two electrical conductors of the further magnetic pole pair are arranged offset by less than 120° relative to each other along the circumference of the rotor.

By using at least one electromagnet, the electrical machine can be operated more flexibly. By adjusting the direction of the electric current for supplying the electrical conductors, the magnetic axis of the further magnets can be adjusted. By changing the direction of the electric current for supplying the electrical conductors, the magnetic axis of the further magnets is rotated by 180°. The further magnets can thus be used to amplify or to compensate for individual components of the magnetomotive force of the rotor by superimposing the magnetic fields of the magnets and of the further magnets. Amplifying one component of the magnetomotive force can be advantageous if this component is used for torque generation. A compensation or attenuation of a component of the magnetomotive force may be advantageous if this component is not used for torque generation.

According to at least one embodiment of the electrical machine, the magnetic axis of the magnets points in the opposite direction compared to the magnetic axis of the further magnets. This means that the magnetic axis of the magnets encloses an angle of 180° with the magnetic axis of the further magnets. In this arrangement, advantageously, a component or components of the magnetomotive force of the rotor which is used for torque generation can be amplified, and components or a component of the magnetomotive force which is not used for torque generation can be suppressed.

According to at least one embodiment of the electrical machine, the magnetic axis of the magnets, as seen in a cross-section through the rotor, is perpendicular to a radial direction, and the magnetic axis of the further magnets, as seen in a cross-section through the rotor, is not perpendicular to a radial direction. For example, the magnetic axis of the further magnets is parallel to a radial direction, as seen in a cross-section through the rotor. That is, the magnetic axis of the magnets and the magnetic axis of the further magnets may be parallel or antiparallel to each other. In this arrangement of the magnets and the further magnets, advantageously, a component or components of the magnetomotive force of the rotor which is used for torque generation can be amplified, and components or a component of the magnetomotive force which is not used for torque generation can be suppressed.

According to at least one embodiment of the electrical machine, the extension of the magnets or the further magnets along the circumference of the rotor is in each case greater than 180 electrical degrees. It is further possible that the extension of the magnets or the further magnets along the circumference of the rotor is in each case less than 180 electrical degrees. The extension of the magnets or the further magnets along the circumference of the rotor refers to the extension of the magnets or the further magnets along the circumference of the rotor. For example, as seen in cross-section through the rotor, the magnets or the further magnets may extend over an angular range of 60° along the circumference of the rotor. Thus, the extension of the magnets or the further magnets along the circumference of the rotor refers to the geometric arrangement of the magnets or the further magnets.

The electrical degrees refer to the magnetic field of the rotor. If the magnetic field of the rotor has two magnetic poles, 360 electrical degrees correspond to 360 geometric degrees. If the magnetic field of the rotor has six magnetic poles, 360 electrical degrees correspond to 120 geometric degrees. This means that the magnetic flux density of the magnetic field of the rotor has three maxima and three minima along the circumference of the rotor. If the magnets or the further magnets are arranged along the circumference of the rotor or if the magnets or the further magnets extend along the circumference of the rotor, the geometric extension of the magnets or further magnets may correspond to more than 180 electrical degrees. Alternatively, the geometric extension of the magnets or further magnets may correspond to less than 180 electrical degrees. This is made possible by the number of the magnetic pole pairs of the rotor being less than the number of the electromagnetic pole pairs able to be generated during operation of the rotor. It may be advantageous to select the extension of the magnets or the further magnets along the circumference of the rotor to be larger or smaller than 180 electrical degrees in each case, since the magnetic flux density of one or more components of the magnetomotive force of the rotor can be selectively changed via the extension of the magnets or further magnets along the circumference of the rotor.

According to at least one embodiment of the electrical machine, the two recesses extend, as seen in a cross-section through the rotor, parallel to a radial direction at least partially through the rotor. In a cross-section through the rotor, the radial direction extends from the center of the rotor to an outer surface of the rotor. The outer surface may be the side facing the air gap. Each of the two recesses extends parallel to a radial direction. The recesses serve to influence the magnetomotive force of the rotor. For example, by introducing the recesses into the rotor, the magnetic flux density of components of the magnetomotive force of the rotor can be influenced. Thus, for example, components can be suppressed or amplified. This enables the use of a component of the magnetomotive force of the rotor with an order of greater than 1 for torque generation.

According to at least one embodiment of the electrical machine, the magnets are arranged in each case in one of the recesses of the rotor. This may mean that each magnet is arranged in one recess of the rotor. The recesses may each be directly adjacent to the air gap between the rotor and the stator. The magnets in the recesses may partially or completely fill the recesses. For such a rotor, the $3^{rd}$ order component of the magnetomotive force of the rotor may have a greater flux density than the fundamental wave. This is advantageous for a use of this component for torque generation.

According to at least one embodiment of the electrical machine, an insulating material is arranged in the recesses, which is not magnetic. The insulating material may be electrically and/or magnetically insulating. The insulating material may completely fill the recesses. For example, the insulating material comprises air.

The recesses with the insulating material can act as magnetic flux barriers. This can reduce the magnetic flux density of components of the magnetomotive force of the rotor. For example, if one of the components of the magnetomotive force of the rotor is undesirable because it is not used for torque generation, it is advantageous to reduce the magnetic flux density of that component. A high magnetic flux density of components which are not used for torque generation can lead to losses in the electrical machine, loud noise and saturation of the rotor core. In particular, the width of the recesses with the insulating material along the circumference of the rotor has an influence on the magnetic flux density of components of the magnetomotive force.

According to at least one embodiment of the electrical machine, the main direction of extension of the magnets, as seen in a cross-section through the rotor, extends in a radial direction. Further, it is possible that the main direction of extension of the further magnets, as seen in a cross-section through the rotor, extends in a radial direction. The cross-section extends in a plane which is perpendicular to the axis of rotation of the rotor. Thus, the magnets or the further magnets extend along the radial direction. This means that the magnets may have the same main direction of extension. The further magnets may also have the same main direction of extension. The main direction of extension of the magnets may be different from the main direction of extension of the further magnets. In this case, the magnets may be arranged so as to be 180° offset with respect to each other along the circumference of the rotor. The further magnets may also be arranged so as to be 180° offset with respect to each other along the circumference of the rotor. According to this embodiment, the magnets or the further magnets may be arranged in the recesses of the rotor. For such a rotor, the $3^{rd}$ order component of the magnetomotive force of the rotor may have a larger flux density than the fundamental wave. This is advantageous for using this component for torque generation.

According to at least one embodiment of the electrical machine, the main direction of extension of the magnets or of the further magnets, as seen in a cross-section through the rotor, is perpendicular to a radial direction. The main direction of extension of the magnets or further magnets is the main direction of extension in a cross-section through the rotor. If the magnets or the further magnets have the shape of a rectangle, as seen in cross-section through the rotor, the main direction of extension of the magnets or the further magnets extends along the longer side of the rectangle. In cross-section through the rotor, the magnets and the further magnets may have the same main direction of extension. Here, the main direction of extension of the magnets may be parallel to the radial direction and the main direction of extension of the further magnets may be perpendicular to the radial direction. Here, the radial direction refers to the position at which the respective magnet is arranged. This may mean that the radial direction for the magnets is different from the radial direction for the further magnets. Alternatively, it is possible that the main direction of extension of the magnets is perpendicular to the radial direction and that the main direction of extension of the further magnets is parallel to the radial direction.

If the main direction of extension of the magnets or of the further magnets extends perpendicular to the radial direction, as seen in a cross-section through the rotor, the magnets and the further magnets can have the same main direction of extension in the cross-section through the rotor. Advantageously, this allows to amplify a component or components of the magnetomotive force of the rotor that is or are used to generate torque and to suppress a component or components of the magnetomotive force that is or are not used to generate torque. As a result, the electrical machine can be operated efficiently.

According to at least one embodiment of the electrical machine, the electrical machine comprises at least one further rotor, wherein the rotor and the further rotor are arranged along an axis and are rotated relative to each other by an angle of at least 45 electric degrees. The further rotor may have a structure as described for the rotor of the electrical machine. In this arrangement, the rotor and the further rotor may have the same or a different structure. The rotor and the further rotor can be arranged on a common shaft. In this case, the axis along which the rotor and the further rotor are arranged extends along the shaft. The fact that the rotor and the further rotor are rotated relative to each other by an angle of at least 45 electrical degrees may mean that an axis of symmetry of the rotor is not parallel to an axis of symmetry of the further rotor. Advantageously, this means that any unevenness in the structure of the rotor can be compensated for by the further rotor and thus the electrical machine can be operated more efficiently on the whole.

According to at least one embodiment of the electrical machine, the electrical machine comprises at least one further rotor which is constructed like the rotor, wherein the rotor and the further rotor are arranged along an axis and are rotated relative to each other by an angle of at least 45 electric degrees. That is, the rotor and the further rotor have the same structure. The rotor and the further rotor can be arranged on a common shaft. In this case, the axis along which the rotor and the further rotor are arranged extends along the shaft. The rotor and the further rotor can be arranged at a distance from each other. The fact that the rotor and the further rotor are rotated by an angle of at least 45 electrical degrees with respect to each other may mean that an axis of symmetry of the rotor is not parallel to an axis of symmetry of the further rotor. The two recesses of the rotor may extend along a first axis. The two recesses of the further rotor may extend along a second axis. The first axis and the second axis enclose an angle greater than 0° with each other. The angle between the first axis and the second axis may depend on the configuration of the rotor and the second rotor. If the rotor and the further rotor each have four electromagnetic pole pairs able to be generated during operation, the first axis and the second axis may enclose an angle of 180°. That is, the rotor and the further rotor may be rotated by an angle of 180° with respect to each other. In this case, the angle of 180° corresponds to an angle of 360 electrical degrees. That is, the rotor and the further rotor may be rotated by an angle of 360 electrical degrees with respect to each other. When rotated by an angle of 360 degrees, irregularities in the structure of the rotor or an asymmetrical structure of the rotor can be compensated for by the further rotor. Therefore, the electrical machine can be operated efficiently.

According to at least one embodiment of the electrical machine, the electrical machine comprises at least two further rotors which are constructed like the rotor, wherein the rotor and the further rotors are arranged along an axis and are rotated relative to each other by an angle of at least 45 electric degrees. The two recesses of the rotor may extend along a first axis. The two recesses of the first further rotor may extend along a second axis. The two recesses of the second further rotor may extend along a third axis. If the rotor and the further rotors each have six electromagnetic pole pairs able to be generated in operation, the first axis, the second axis, and the third axis may enclose an angle of 120° in each case. That is, the rotor and the further rotors may each be rotated by an angle of 120° with respect to each other. In this case, the angle of 120° corresponds to an angle of 360 electrical degrees.

It is further possible that the electrical machine has several further rotors in the case of a larger number of electromagnetic pole pairs.

Since the number of electromagnetic pole pairs able to be generated during operation of the rotor or the further rotors can be larger than the number of magnetic pole pairs of the respective rotor, a magnetic flux density induced by the stator during operation can penetrate into different materials of the rotors. That is, the magnetic field lines of the different magnetic poles may extend through different areas of the rotors. The rotor and the further rotor each comprise magnets and a rotor core. Thus, it is possible that the magnetic field lines of one pole near the air gap penetrate only into the rotor core. Magnetic field lines from another pole can penetrate both the rotor core and one of the magnets near the air gap. To compensate for the difference between the different poles, the electrical machine has a rotor and at least one further rotor. Thereby, the rotor and the at least one further rotor are rotated with respect to each other, so that the magnetic field lines as a whole extend through equal materials.

Furthermore, a method for operating the electrical machine described herein is disclosed. Thus, all features of the electrical machine described are also disclosed for the method for operating the electrical machine, and vice versa.

According to at least one embodiment of the method for operating the electrical machine, a component of the magnetomotive force of the rotor with an order greater than 1 is used for torque generation. This means that the 1$^{st}$ order component of the magnetomotive force of the rotor, which is referred to as the fundamental wave, is not used for torque generation. Instead, a higher harmonic of the magnetomotive force of the rotor is used for torque generation. This means that during operation of the electrical machine, a component of the magnetomotive force of the rotor with an order greater than 1 interacts with the magnetic field of the stator for torque generation. Thus, the number of the magnetic pole pairs of the rotor is smaller than the number of the electromagnetic pole pairs able to be generated during operation of the rotor. The magnets and the further magnets can be arranged in the rotor in such a way that the flux density is maximized for that component of the magnetomotive force of the rotor which is used for torque generation. Advantageously, it is also possible to minimize the flux density of components of the magnetomotive force of the rotor that are not used for torque generation. This enables efficient operation of the electrical machine.

In the following, the electrical machine described herein and the method for operating the electrical machine are explained in more detail in connection with exemplary embodiments and the associated Figures.

FIGS. 3A, 3B, 4A, and 4B describe an electrical machine by way of example.

FIGS. 5A and 5B describe another electrical machine by way of example.

FIGS. 6A and 6B plot the magnetic flux density for two electrical machines by way of example.

FIGS. 7A, 7B, 8A and 8B describe another electrical machine by way of example.

FIGS. 9, 10A and 10B show a schematic cross-section of an electrical machine according to an exemplary embodiment.

Figure 11A:
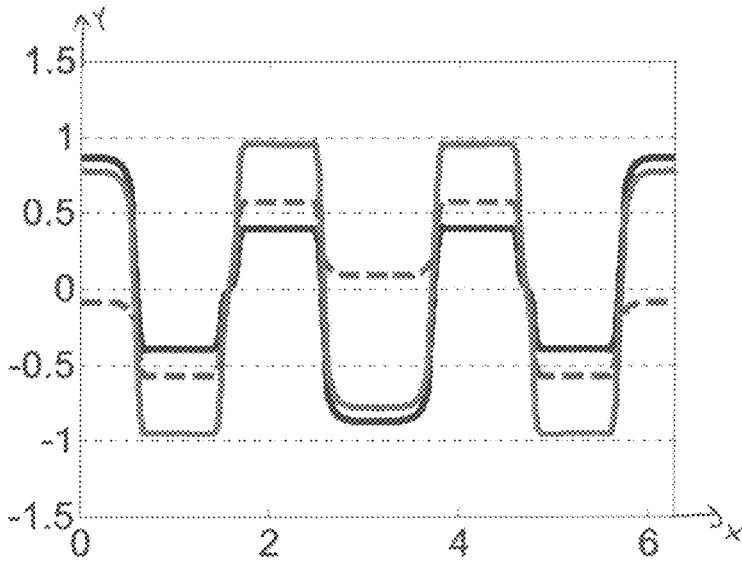
Figure 11B:
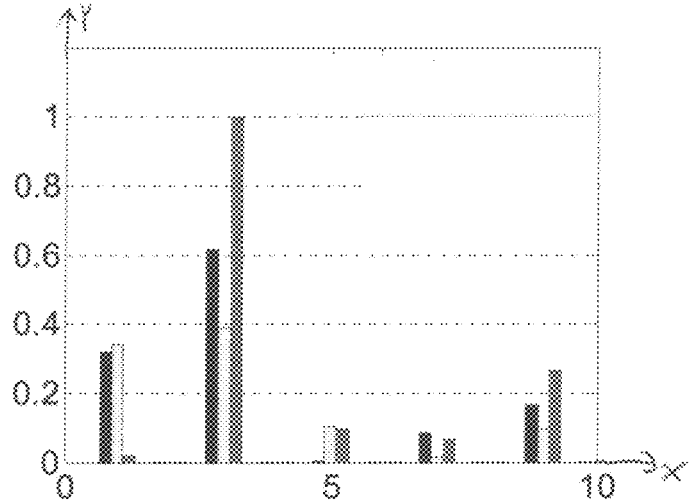

In FIGS. 11A and 11B, the magnetic flux density is plotted for two electrical machines and one electrical machine according to an exemplary embodiment.

Figure 12A:
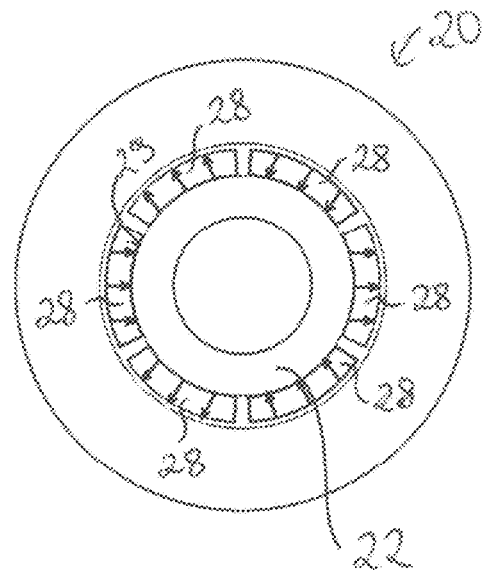

In FIG. 12A, a cross-section through another electrical machine is shown by way of example.

Figure 12B:
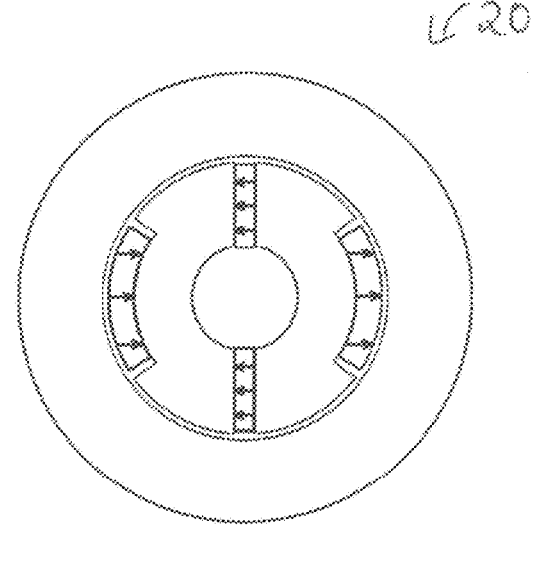

In FIG. 12B, a schematic cross-section through an electrical machine according to an exemplary embodiment is shown.

Figure 12C:
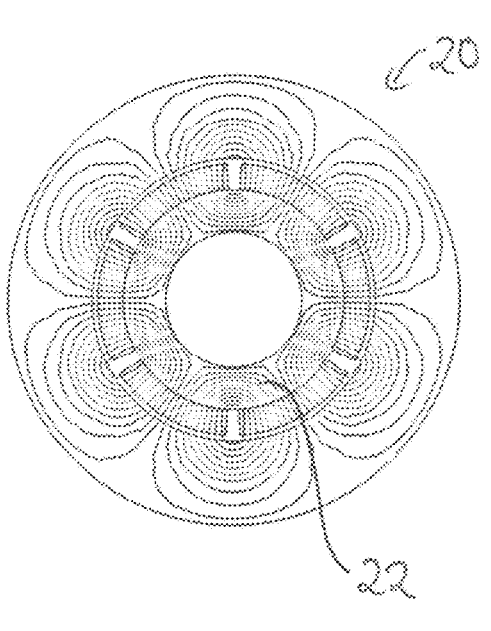

In FIG. 12C, the distribution of the magnetic flux density in the electrical machine shown in FIG. 12A is illustrated.

Figure 12D:
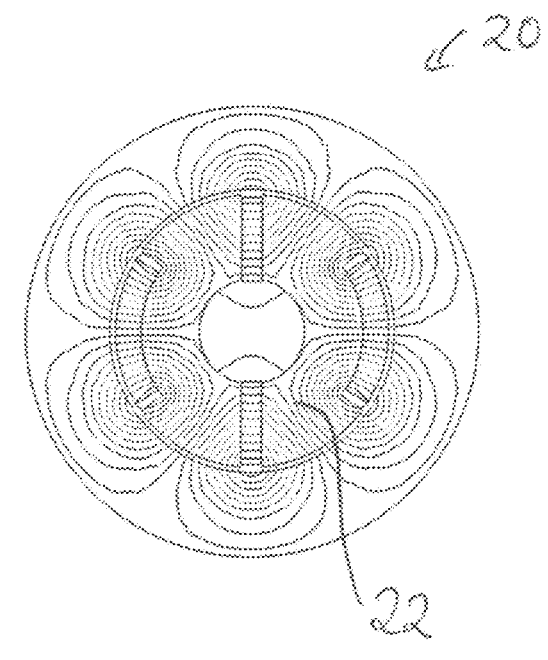

In FIG. 12D, the distribution of magnetic flux density in the exemplary embodiment of an electrical machine shown in FIG. 12B is illustrated.

Figure 12E:
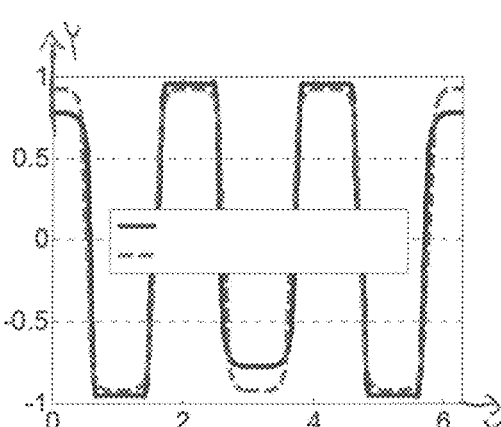
Figure 12F:
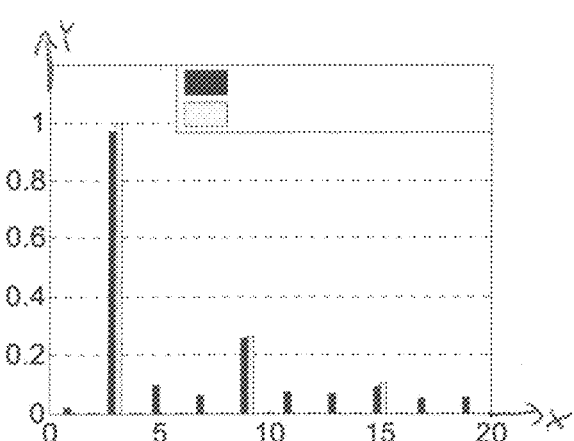

In FIGS. 12E and 12F, the magnetic flux density is plotted for an electrical machine and an electrical machine according to an exemplary embodiment.

Figure 13A:
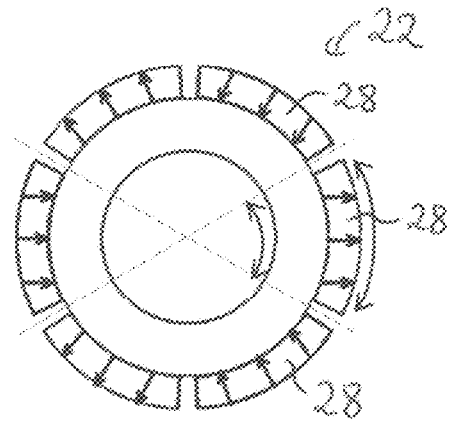

FIG. 13A shows an exemplary cross-section through a rotor.

Figure 13B:
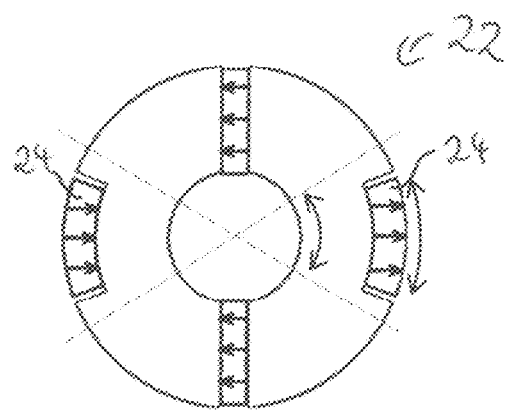
Figure 13C:
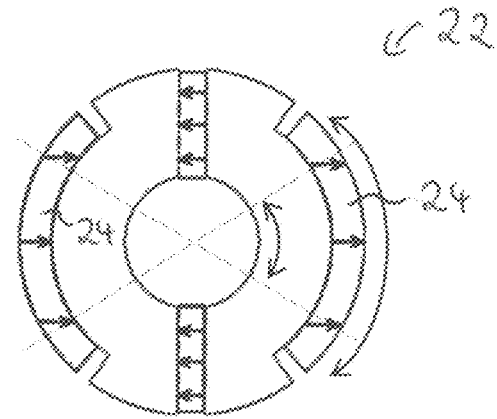

FIGS. 13B and 13C each show a cross-section through a rotor according to an exemplary embodiment.

FIGS. 14A, 14B, 14C, 14D, 15A, 15B, 16A, 16B, 17A, 17B, 17C, 17D, 17E and 17F each show a cross-section through an electrical machine according to various exemplary embodiments.

Figure 18A:
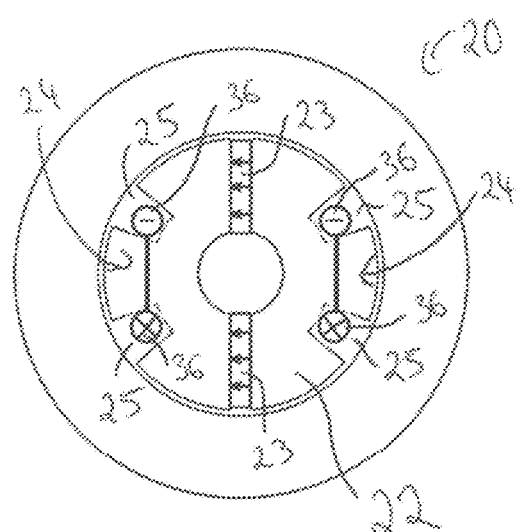

In FIG. 18A, a schematic cross-section through a further exemplary embodiment of the electrical machine is shown.

Figure 18B:
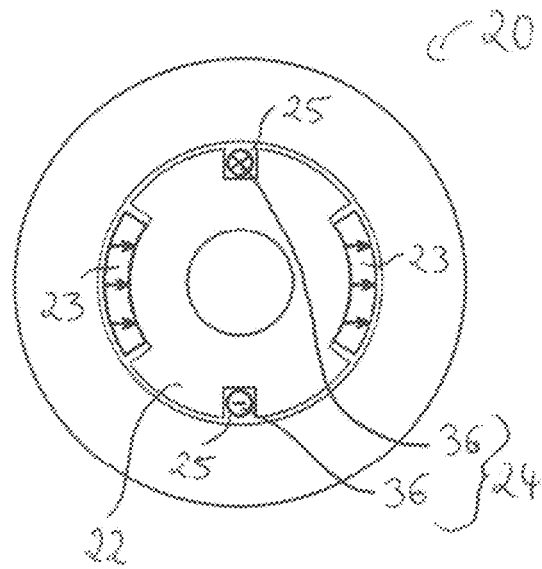

In FIG. 18B, a schematic cross-section through a further exemplary embodiment of the electrical machine is shown.

Figure 19A:
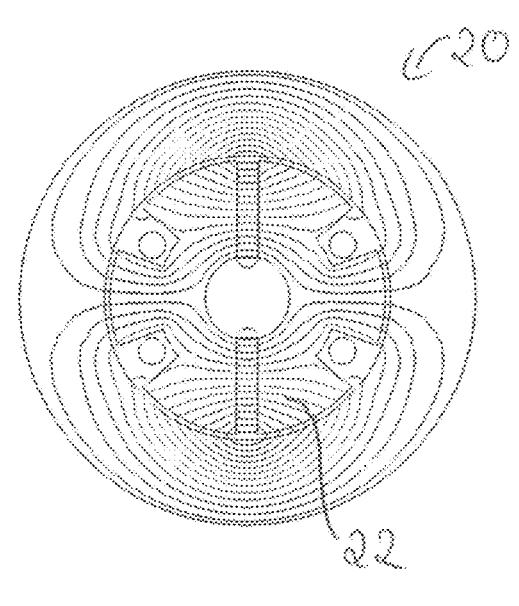

In FIG. 19A, the magnetic flux density in the electrical machine shown in FIG. 18A is illustrated.

Figure 19B:
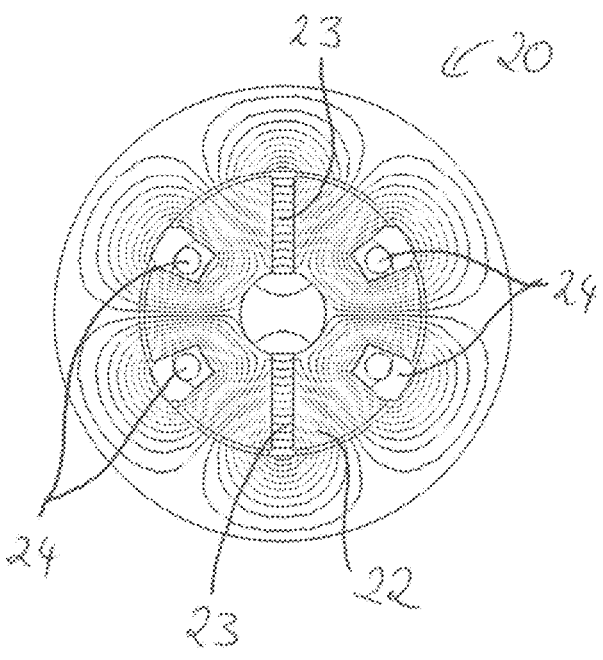

In FIG. 19B, the magnetic flux density of the electrical machine shown in FIG. 18B is illustrated.

FIGS. 20A, 20B, 21A, and 21B plot the magnetic flux density for electrical machines according to various exemplary embodiments.

FIGS. 22A, 22B, 22C, 22D, 23A and 23B describe another exemplary embodiment of the electrical machine with two further rotors.

Figure 24A:
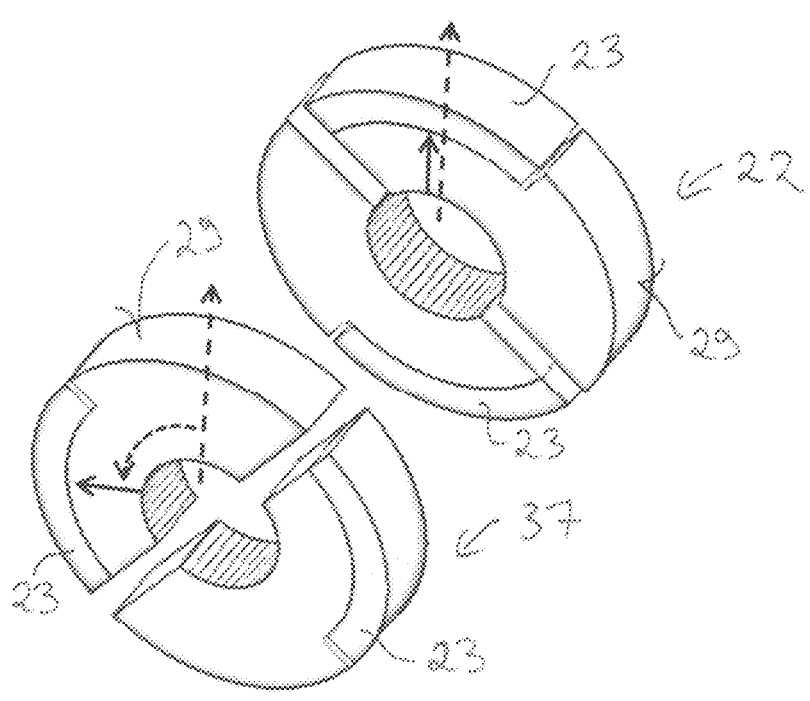
Figure 24B:
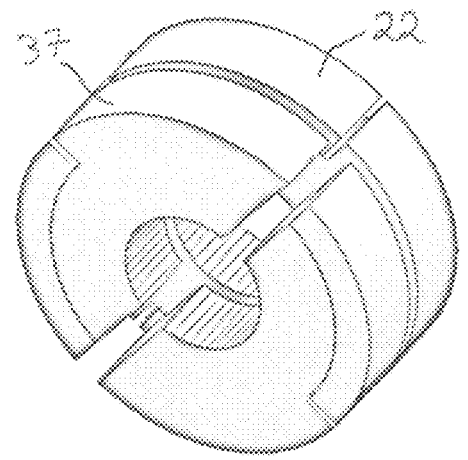

FIGS. 24A and 24B describe a further exemplary embodiment of the electrical machine with one further rotor.

Figure 1A:
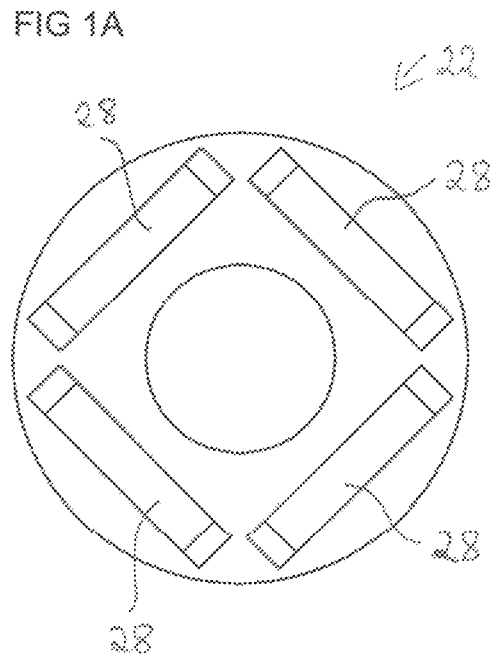
FIGS. 1A and 1B show a schematic cross-section through a rotor by way of example.

In FIG. 1A, a schematic cross-section through a rotor 22 is shown as an example. The rotor 22 is not an exemplary embodiment. The rotor 22 has four permanent magnets 28 arranged in the rotor 22.

Figure 1B:
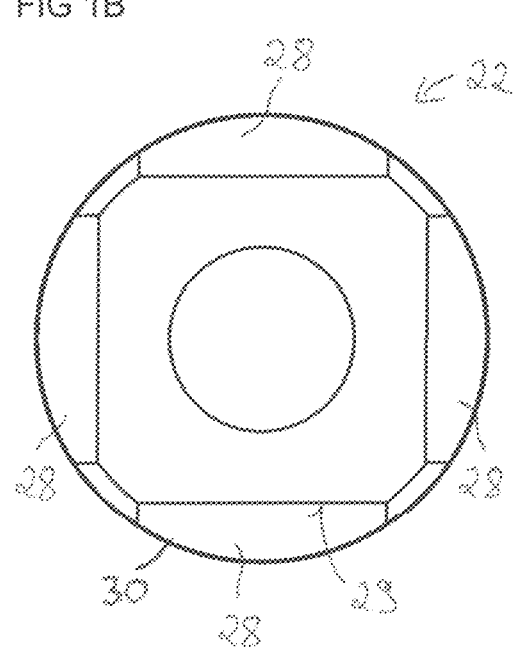

In FIG. 1B, a schematic cross-section through another rotor 22 is shown as an example. The rotor 22 is not an exemplary embodiment. The rotor 22 has four permanent magnets 28, which are arranged on an outer surface 29 of the rotor 22. By means of a mounting 30, the permanent magnets 28 are held on the rotor 22 even at high rotational speeds of the rotor 22. The use of permanent magnets 28 for a rotor 22 allows a large number of possibilities for arranging the permanent magnets 28 on or in the rotor 22.

Figure 2:
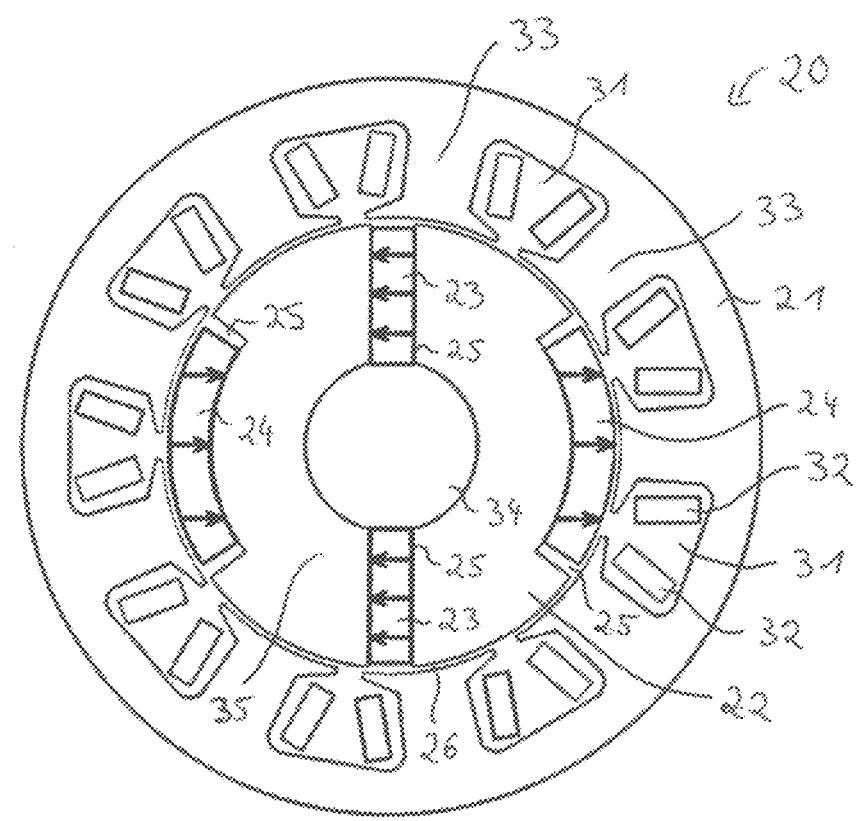
FIG. 2 shows a schematic cross-section through an electrical machine according to an exemplary embodiment.

FIG. 2 shows a schematic cross-section through an electrical machine 20 according to an embodiment. The electrical machine 20 has a stator 21 and a rotor 22 rotatably mounted relative to the stator 21. The rotor 22 is an internal rotor which is arranged in the stator 21. That is, in the cross-section shown, the stator 21 completely surrounds the rotor 22.

The stator 21 has a plurality of slots 31. The slots 31 are arranged in the stator 21. A stator winding 32 is disposed in the slots 31. The stator winding 32 may have coils wound around teeth 33 of the stator 21, the teeth 33 being arranged between each two slots 31. The stator winding 32 comprises an electrically conductive material. Alternatively, the stator winding 32 may comprise electrically conductive rods arranged in the slots 31. An air gap 26 is arranged between the stator 21 and the rotor 22. The slots 31 are directly adjacent to the air gap 26.

The rotor 22 has a magnetic pole pair comprising two magnets 23. The magnets 23 are each arranged in a recess 25 in the rotor 22. Here, the recesses 25 extend from the air gap 26 to a shaft 34 on which the rotor 22 is arranged. That is, the recesses 25 extend in cross-section through the rotor 22 parallel to a radial direction. Each radial direction extends from the center of the rotor 22 toward the air gap 26. The rotor 22 comprises a rotor core 35. The recesses 25 extend completely through the rotor core 35.

Furthermore, the two recesses 25 are arranged to be offset from each other by 180° along the circumference of the rotor 22. This means that the two recesses 25 are arranged at opposite sides in the rotor 22. Since the magnets 23 are arranged in the recesses 25, the main direction of extension of the magnets 23 in cross-section through the rotor 22 extends in a radial direction. The magnets 23 completely fill the recesses 25 in each case. Each of the magnets 23 is a permanent magnet. The magnetic axis of the magnets 23 is shown with arrows. The magnetic axis of the magnets 23 is perpendicular to a radial direction in cross-section through the rotor 22. The magnetic axis of the two magnets 23 extends in the same direction. Along the circumference of the rotor 22, the magnets 23 extend over a range of less than 60°.

The rotor 22 also has a further magnetic pole pair comprising two further magnets 24. The further magnets 24 are each arranged in a recess 25 in the rotor 22. The recesses 25 are directly adjacent to the air gap 26. The recesses 25 extend from the air gap 26 into the rotor 22, which means that the recesses 25 are arranged in the rotor core 35. The recesses 25 in which the further magnets 24 are arranged extend less far through the rotor 22 than the recesses 25 in which the magnets 23 are arranged.

The recesses 25 in which the further magnets 24 are arranged each extend over a range of at least 30° along the circumference of the rotor 22. For example, the recesses 25 in which the further magnets 24 are arranged extend over a range of at least 50° along the circumference of the rotor 22. Preferably, the recesses 25 in which the further magnets 24 are arranged extend over a range of 60° along the circumference of the rotor 22. The recesses 25 in which the further magnets 24 are arranged are disposed to be offset by 180° with respect to each other along the circumference of the rotor 22. This means that the further magnets 24 are arranged at opposite sides of the rotor 22.

The further magnets 24 each partially fill the recesses 25. The further magnets 24 extend along the circumference of the rotor 22. That is, the further magnets 24 each have the shape of a segment of a circle. Thus, the further magnets 24 have a curved shape.

The further magnets 24 are permanent magnets. The magnetic axis of the further magnets 24 is shown with arrows. The magnetic axis of the further magnets 24 is parallel to a radial direction in a cross-section through the rotor 22. The magnetic axis of the two further magnets 24 extends in the same direction. That is, the magnetic axis of one further magnet 24 points towards the center of the rotor 22 and the magnetic axis of the other further magnet 24 points towards the air gap 26. The magnetic axis of the magnets 23 points in the opposite direction compared to the magnetic axis of the further magnets 24. Thus, the magnetic axis of the magnets 23 and the magnetic axis of the further magnets 24 enclose an angle of 180°.

Thus, the number of magnetic pole pairs of the rotor 22 is 2. The number of electromagnetic pole pairs able to be generated during operation of the rotor 22 is 3. Therefore, the number of the magnetic pole pairs of the rotor 22 is different from the number of electromagnetic pole pairs able to be generated during operation of the rotor 22. The electromagnetic pole pairs able to be generated during operation of the rotor 22 are described in more detail in the following Figures.

Figure 3A:
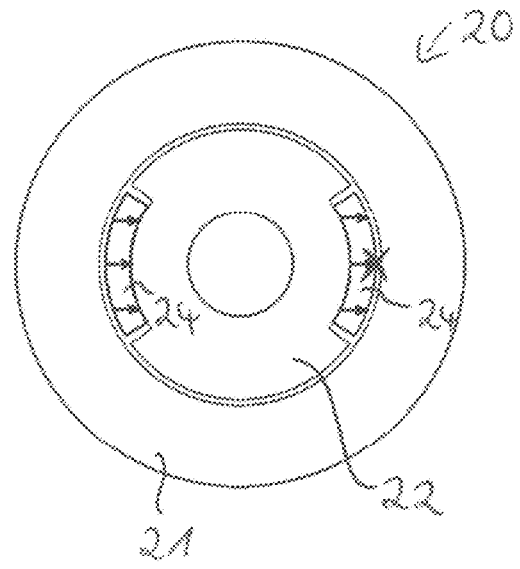

By way of example, FIG. 3A shows a schematic cross-section through an electrical machine 20. The electrical machine 20 is not an exemplary embodiment. Compared to the rotor 22 shown in FIG. 2, the rotor 22 of the electrical machine 20 in FIG. 3A has only the further magnets 24. The rotor 22 has no recesses 25 in which magnets 23 are arranged. The further magnets 24 each extend over an angle of 60° along the circumference of the rotor 22.

Figure 3B:
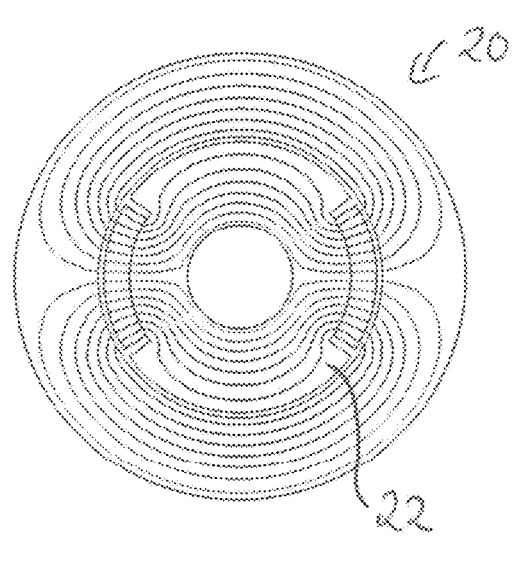

FIG. 3B shows the distribution of the simulated magnetic flux density in the cross-section shown in FIG. 3A. The magnetic field of the rotor 22 has two magnetic poles.

Figure 4A:
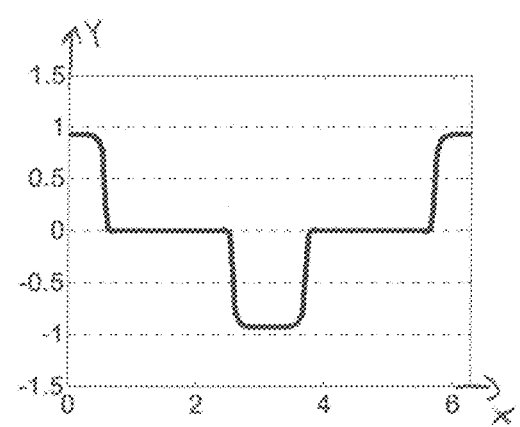

FIG. 4A shows the simulated magnetic flux density in the air gap 26 for the electrical machine 20 shown in FIG. 3A. On the x-axis, the angle along the air gap 26 is plotted in radians. The position of the angle of 0° is marked with an x in FIG. 3A. On the y-axis, the magnetic flux density is plotted in Tesla. The magnetic field in the air gap 26 thus has two electromagnetic poles.

Figure 4B:
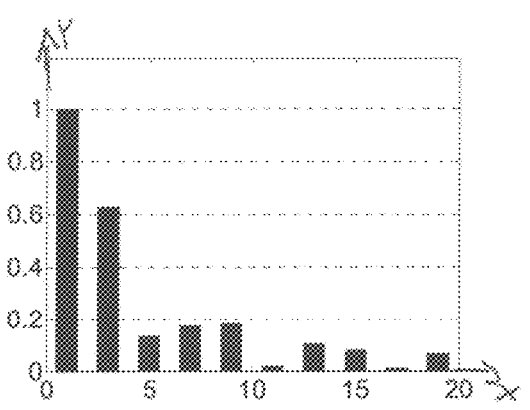

FIG. 4B shows the simulated harmonic components of the magnetic flux density in the air gap 26 of the electrical machine 20 shown in FIG. 3A. The order of the components is plotted on the x-axis. On the y-axis, the magnetic flux density is plotted normalized to 1. The component of the $1^{st}$ order exhibits the greatest flux density. In addition, the $3^{rd}$ order component has a flux density of greater than 0.6. It has been shown that the flux density of the $3^{rd}$ order component is maximum when the further magnets 24 each extend over an angle of 60° along the circumference of the rotor 22. When the $3^{rd}$ order component is used to generate torque, the rotor 22 has three electromagnetic pole pairs. However, since the magnetic flux density of the $1^{st}$ order component is greater than the magnetic flux density of the $3^{rd}$ order component, the efficiency of the electrical machine 20 is reduced. The relatively high magnetic flux density of the $1^{st}$ order component, which is not used for torque generation, leads to losses in the stator 21, high noise generation and saturation of the rotor core 35.

FIG. 5A shows an example of a schematic cross-section through another electrical machine 20. The electrical machine 20 is not an exemplary embodiment. Compared to the rotor 22 shown in FIG. 3A, the rotor 22 of the electrical machine 20 shown in FIG. 5A additionally has two recesses 25. The recesses 25 are arranged like the recesses 25 shown in FIG. 2, in which the magnets 23 are arranged in FIG. 2. The recesses 25 in FIG. 5A are free of the material of the rotor core 35. An insulating material 27, which is not magnetic, is arranged in the recesses 25. For example, there is air in the recesses 25.

FIG. 5B shows the distribution of the simulated magnetic flux density in the cross-section shown in FIG. 5A. The recesses 25 act as a flux barrier so that the magnetic field of the rotor 22 has six electromagnetic poles.

In FIG. 6A, the simulated magnetic flux density in the air gap 26 is shown with a solid line for the electrical machine 20 shown in FIG. 3A and with a dashed line for the electrical machine 20 shown in FIG. 5A. On the x-axis, the angle along the air gap 26 is plotted in radians. On the y-axis, the magnetic flux density is plotted in Tesla. The magnetic field of the electrical machine 20 shown in FIG. 5A has six electromagnetic poles in the air gap 26. The magnetic field of the electrical machine 20 shown in FIG. 3A has only two electromagnetic poles in the air gap 26.

In FIG. 6B, the simulated harmonic components of the magnetic flux density in the air gap 26 of the electrical machine 20 shown in FIG. 3A are plotted with black bars and of the electrical machine 20 shown in FIG. 5A plotted with white bars. The order of the components is plotted on the x-axis. On the y-axis, the magnetic flux density is plotted normalized to 1. Compared to the electrical machine 20 shown in FIG. 3A, the flux density of the 3rd order component is substantially increased for the electrical machine 20 shown in FIG. 5A. In addition, for the electrical machine 20 of FIG. 5A, the flux density of the $1^{st}$ order component is substantially less than the flux density of the $3^{rd}$ order component. Thus, the introduction of the recesses 25 results in a relative decrease in the flux density of the $1^{st}$ order component and a relative increase in the flux density of the $3^{rd}$ order component. Therefore, the $3^{rd}$ order component of the magnetomotive force of the rotor 22 can be used more efficiently to generate torque.

FIG. 7A shows an example of a schematic cross-section of another electrical machine 20. The electrical machine 20 is not an exemplary embodiment. Compared to the rotor 22 shown in FIG. 2, in the rotor 22 of the electrical machine 20 shown in FIG. 7A no further magnets 24 are arranged in the recesses 25. Air may be present in the recesses 25.

FIG. 7B shows the distribution of the simulated magnetic flux density in the cross-section shown in FIG. 7A. The magnetic field of the rotor 22 has six electromagnetic poles.

FIG. 8A shows the simulated magnetic flux density in the air gap 26 for the electrical machine 20 shown in FIG. 7A. On the x-axis, the angle along the air gap 26 is plotted in radians. On the y-axis, the magnetic flux density is plotted in Tesla. The magnetic field in the air gap 26 thus has six electromagnetic poles.

FIG. 8B plots the simulated harmonic components of the magnetic flux density in the air gap 26 of the electrical machine 20 shown in FIG. 7A. The order of the components is plotted on the x-axis. On the y-axis, the magnetic flux density is plotted normalized to 1. The $3^{rd}$ order component exhibits the largest value of the magnetic flux density. The $1^{st}$ order component also has a relatively high value of magnetic flux density.

FIG. 9 shows that the rotor 22 shown in FIG. 2 is a combination of the rotors 22 shown in FIGS. 5A and 7A. On the left side, the electrical machines 20 shown in FIGS. 5A and 7A are illustrated. On the right side, a schematic cross-section through the electrical machine 20 according to an embodiment is shown, with the rotor 22 of the electrical machine 20 being a combination of the rotors 22 shown in FIGS. 5A and 7A.

FIG. 10A shows a schematic cross-section through the electrical machine 20 according to the exemplary embodiment shown in FIG. 9. The structure of the stator 21 is arbitrary.

FIG. 10B shows the distribution of the simulated magnetic flux density in the cross-section shown in FIG. 10A. The rotor 22 has four magnetic poles and six electromagnetic poles. That is, the rotor 22 has two magnetic pole pairs and three electromagnetic pole pairs.

In FIG. 11A, the simulated magnetic flux density in the air gap 26 for the electrical machine 20 shown in FIG. 5A is shown with a black line, for the electrical machine 20 shown in FIG. 7A it is shown with a dashed line, and for the embodiment of the electrical machine 20 shown in FIG. 10A it is shown with a gray line. On the x-axis, the angle along the air gap 26 is plotted in radians. On the y-axis, the magnetic flux density is plotted in Tesla. Thus, the exemplary embodiment of the rotor 22 shown in FIG. 10A has six electromagnetic poles.

In FIG. 11B, the simulated harmonic components of the magnetic flux density in the air gap 26 of an electrical machine 20 with a rotor 22 shown in FIG. 5A are plotted in black, with a rotor 22 shown in FIG. 7A in light gray, and with an exemplary embodiment of the rotor 22 shown in FIG. 10A in gray. On the x-axis, the order of the components is plotted. On the y-axis, the magnetic flux density is plotted normalized to 1. For the rotor 22 shown in FIG. 10A, the $1^{st}$ order component is substantially reduced compared to the $3^{rd}$ order component. The $1^{st}$ order component is reduced to less than 0.05. This is achieved by the magnetic axis of the magnets 23 enclosing an angle of 180° with the magnetic axis of the further magnets 24.

Thus, the magnetic axis of the magnets 23 points in the opposite direction compared to the magnetic axis of the further magnets 24. This means that the $1^{st}$ order component of the magnetic field of the magnets 23 is shifted by 180° relative to the $1^{st}$ order component of the magnetic field of the further magnets 24. Therefore, the two $1^{st}$ order components compensate each other. This can be seen in FIG. 11B from the greatly reduced flux density of the $1^{st}$ order component. In addition, the $3^{rd}$ order component of the magnetic field of the magnets 23 is shifted by 360° to the $3^{rd}$ order component of the magnetic field of the further magnets 24. This means that the $3^{rd}$ order components add up. Therefore, the $3^{rd}$ order component for the rotor 22 shown in FIG. 10A has a greater flux density than for the other two rotors 22.

In FIG. 12A, a cross-section through an electrical machine 20 is shown as an example. The electrical machine 20 is not an exemplary embodiment. The rotor 22 of the electrical machine 20 has six permanent magnets 28. The permanent magnets 28 are arranged on the outer surface 29 of the rotor 22 along the circumference of the rotor 22. The magnetic axes of adjacent permanent magnets 28 point in opposite directions. The magnetic axes of the permanent magnets 28 are each parallel to a radial direction in cross-section through the rotor 22.

FIG. 12B shows, for comparison, a schematic cross-section through the exemplary embodiment of the electrical machine 20 shown in FIG. 10A.

FIG. 12C shows the distribution of simulated magnetic flux density in the cross-section shown in FIG. 12A. The rotor 22 has six magnetic poles and six electromagnetic poles. That is, the ratio between the number of magnetic poles and the number of electromagnetic poles is 1, which is an integer.

FIG. 12D shows, for comparison, the distribution of simulated magnetic flux density in the cross-section shown in FIG. 12B. The rotor 22 has four magnetic poles and six electromagnetic poles. Here, the ratio of the number of magnetic poles to the number of electromagnetic poles is 2/3. In the electrical machine 20 described here, the ratio between the number of magnetic poles and the number of electromagnetic poles is not an integer.

In FIG. 12E, the simulated magnetic flux density in the air gap 26 for the electrical machine 20 shown in FIG. 12A is shown with a dashed line and for the embodiment of the electrical machine 20 shown in FIG. 12B with a solid line. On the x-axis, the angle along the air gap 26 is plotted in radians. On the y-axis, the magnetic flux density is plotted in Tesla. Both electrical machines 20 have six electromagnetic poles.

In FIG. 12F, the simulated harmonic components of the magnetic flux density in the air gap 26 of an electrical machine 20 with a rotor 22 shown in FIG. 12A are plotted with white bars and with an embodiment of the rotor 22 shown in FIG. 12B with black bars plotted. On the x-axis, the order of the components is plotted. On the y-axis, the magnetic flux density is plotted normalized to 1. Thus, for the exemplary embodiment of the rotor 22 shown in FIG. 12B, the ratio of the flux density of the $3^{rd}$ order component to the flux density of the $1^{st}$ order component is greater than for rotor 22 shown in FIG. 12A. Thus, the electrical machine 20 described herein can be operated more efficiently.

FIG. 13A shows a schematic cross-section through the rotor 22 of the electrical machine 20 shown in FIG. 12A. An angle of 180 electrical degrees is shown with the dashed lines. The permanent magnets 28 each extend over a range of approximately 180 electrical degrees. This corresponds to 60 geometric degrees.

FIG. 13B shows a schematic cross-section through a rotor 22 according to an exemplary embodiment. The rotor 22 has approximately the structure shown in FIG. 2. An angle of 180 electrical degrees is shown with the dashed lines. The further magnets 24 extend over less than 180 electrical degrees along the circumference of the rotor 22, meaning that the extension of the further magnets 24 along the circumference of the rotor 22 is less than 180 electrical degrees. In the rotor 22 described herein, the extension of the further magnets 24 along the circumference of the rotor 22 can be adjusted as desired to increase the efficiency of the electrical machine 20. In the example of a rotor 22 shown in FIG. 13A, the maximum possible extension of the permanent magnets 28 along the circumference of the rotor 22 is 180 electrical degrees.

FIG. 13C shows a schematic cross-section through a rotor 22 according to another embodiment. The rotor 22 has approximately the structure shown in FIG. 2. An angle of 180 electrical degrees is shown with the dashed lines. The further magnets 24 extend by more than 180 electrical degrees along the circumference of the rotor 22, meaning that the extension of the further magnets 24 along the circumference of the rotor 22 is greater than 180 electrical degrees in each case. Advantageously, in the rotor 22 described herein, the extension of the further magnets 24 along the circumference of the rotor 22 can be adjusted as desired to increase the efficiency of the electrical machine 20.

FIGS. 14A, 14B, 14C and 14D show exemplary embodiments of the electrical machine 20, in which the rotor 22 has six electromagnetic poles.

Figure 14A:
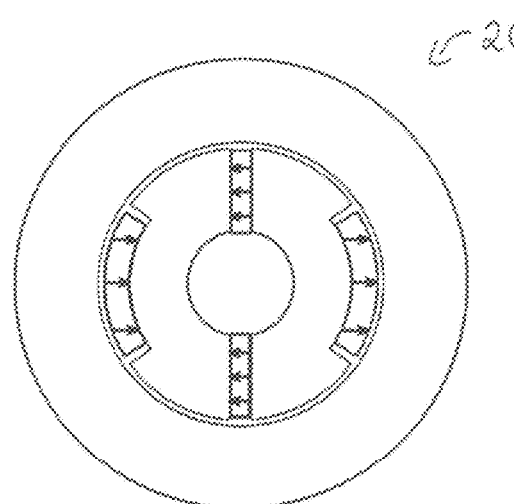

In FIG. 14A, a schematic cross-section through the electrical machine 20 shown in FIG. 10A is illustrated.

Figure 14B:
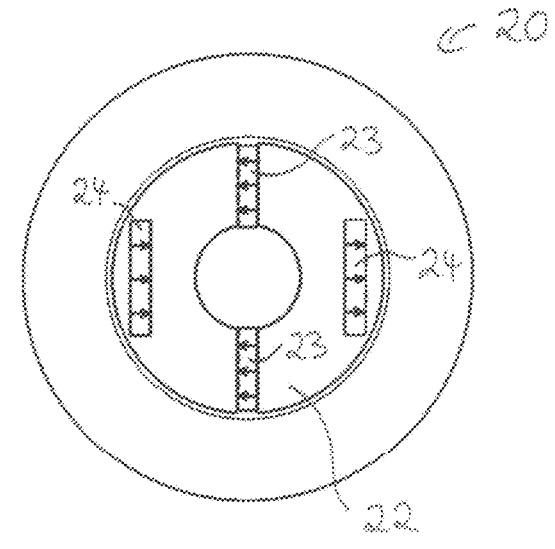

FIG. 14B shows a schematic cross-section through the electrical machine 20 according to another exemplary embodiment. Unlike the rotor 22 shown in FIG. 14A, the further magnets 24 do not extend along the circumference of the rotor 22. The further magnets 24 are arranged entirely within the rotor 22. The further magnets 24 each have the shape of a rectangle in cross-section through the rotor 22. Further, the main direction of extension of the further magnets 24 is parallel to the main direction of extension of the magnets 23. Thus, the main direction of extension of the further magnets 24 in cross-section through the rotor 22 is perpendicular to a radial direction. The magnetic axes of the further magnets 24 point in the same direction. The magnetic axis of the further magnets 24 points in the opposite direction compared to the magnetic axis of the magnets 23. This means that the magnetic axis of the further magnets 24 is perpendicular to the main direction of extension of the further magnets 24. The further magnets 24 are each arranged at a position along the circumference of the rotor 22 which is shifted by 90° with respect to the position of the magnets 23.

Figure 14C:
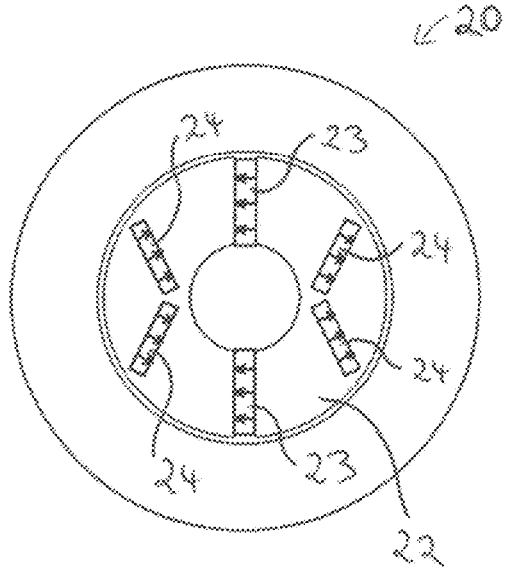

In FIG. 14C, a schematic cross-section through the electrical machine 20 according to a further exemplary embodiment is shown. In contrast to the rotor 22 shown in FIG. 14B, two further magnets 24 are arranged in the rotor 22 instead of each further magnet 24. In this case, two further magnets 24 are each arranged in the form of a V in the rotor 22. Thus, the magnetic axes of the further magnets 24 point in different directions. The magnetic axes of the further magnets 24 each enclose an angle of greater than 90° with the magnetic axis of the magnets 23. The main directions of extension of the further magnets 24 are not parallel to the main direction of extension of the magnets 23.

Figure 14D:
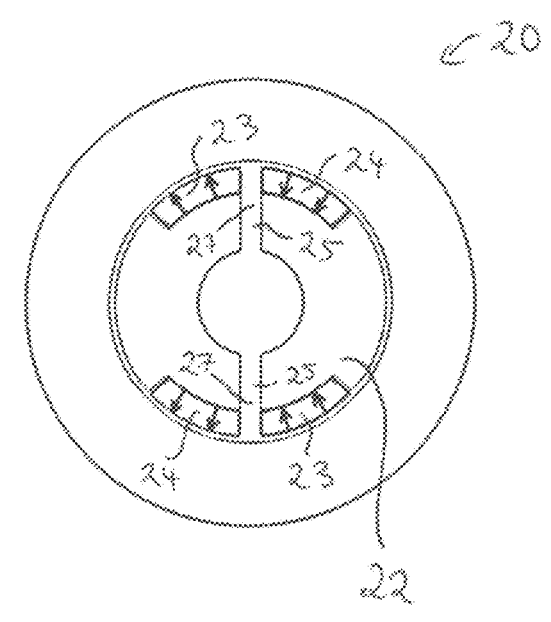

In FIG. 14D, a schematic cross-section through the electrical machine 20 according to a further exemplary embodiment is shown. Compared to the exemplary embodiment shown in FIG. 14A, no magnets 23 are arranged in the recesses 25, but an insulating material 27 is arranged in the recesses 25. The rotor 22 has two magnets 23 and two further magnets 24. The two magnets 23 are each directly adjacent to one of the recesses 25 and are arranged at opposite sides of the rotor 22 in cross-section through the rotor 22. The two further magnets 24 are also each directly adjacent to one of the recesses 25 and are arranged at opposite sides of the rotor 22 in cross-section through the rotor 22. That is, directly adjacent each of the recesses 25, there are arranged one magnet 23 and one further magnet 24. The magnets 23 and the further magnets 24 each have the shape of a segment of a circle. The magnetic axes of the magnets 23 point in the same direction and run parallel to a radial direction in cross-section through the rotor 22. The magnetic axes of the further magnets 24 point in the same direction and in a direction which is different from that direction in which the magnetic axes of the magnets 23 point. The magnetic axes of the further magnets 24 run parallel to a radial direction in cross-section through the rotor 22.

Figure 15A:
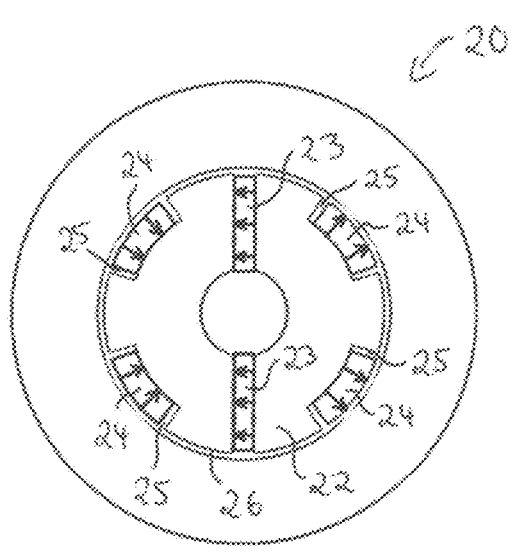

FIG. 15A shows a schematic cross-section through the electrical machine 20 according to another exemplary embodiment. Compared to the rotor 22 shown in FIG. 14A, the rotor 22 shown in FIG. 15A has a total of four further magnets 24. Each two further magnets 24 are arranged at opposite sides of the rotor 22. That is, each two further magnets 24 are arranged so as to be 180° offset from each other along the circumference of the rotor 22. The further magnets 24 are arranged in recesses 25 in the rotor 22. The recesses 25 are directly adjacent to the air gap 26. The further magnets 24 extend along the circumference of the rotor 22 and have a curved shape or the shape of a segment of a circle. The magnetic axes of the further magnets 24 arranged respectively at opposite sides of the rotor 22 point in the same direction. The magnetic axis of each of the further magnets 24 is parallel to a radial direction in cross-section through the rotor 22. The rotor 22 thus has three magnetic pole pairs and five electromagnetic pole pairs.

Figure 15B:
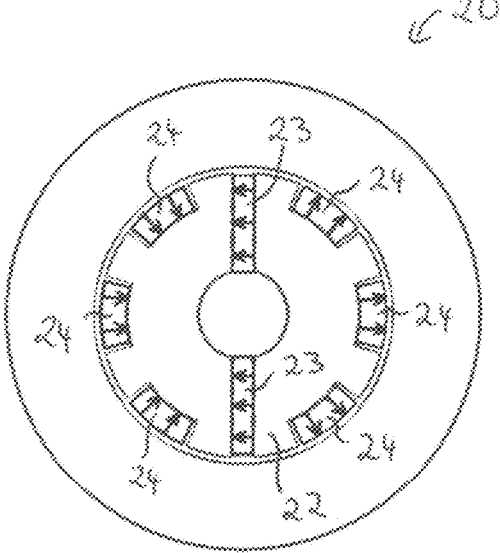

FIG. 15B shows a schematic cross-section through the electrical machine 20 according to another exemplary embodiment. Compared to the exemplary embodiment shown in FIG. 15A, the rotor 22 has six further magnets 24 instead of four. Thus, the rotor 22 has four magnetic pole pairs and seven electromagnetic pole pairs.

Figure 16A:
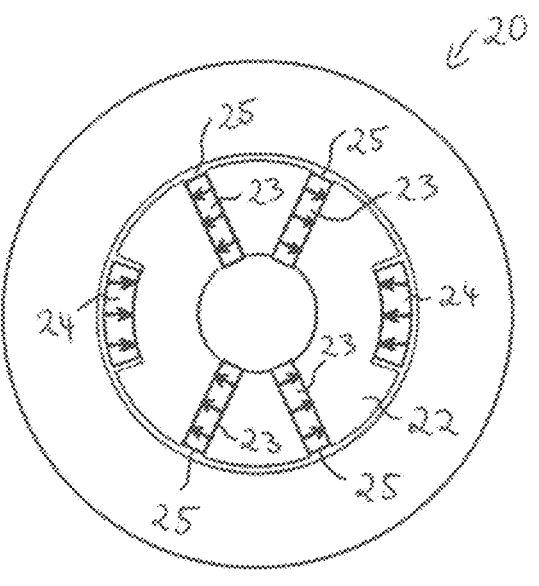

FIG. 16A shows a schematic cross-section through the electrical machine 20 according to another exemplary embodiment. Compared to the embodiment shown in FIG. 10A, the rotor 22 has a total of four magnets 23. The magnets 23 are arranged in recesses 25 in the rotor 22. The recesses 25 each extend parallel to a radial direction in cross-section through the rotor 22. Two magnets 23 each are arranged at opposite sides of the rotor 22. The magnetic axes of the magnets 23 each extend perpendicular to a radial direction in cross section through the rotor 22. The magnetic axes of each two magnets 23, which are arranged 180° offset from each other along the circumference of the rotor 22, enclose an angle of 180° with each other. The main directions of extension of each two magnets 23 enclose an angle of less than 90° with each other. The magnetic axes of these two magnets 23 enclose an angle of greater than 90° with each other. The two further magnets 24 are arranged as in the exemplary embodiment shown in FIG. 10A. In contrast to the rotor 22 shown in FIG. 10A, the magnetic axes of the further magnets 24 enclose an angle of 180° with each other. The rotor 22 thus has three magnetic pole pairs and four electromagnetic pole pairs.

Figure 16B:
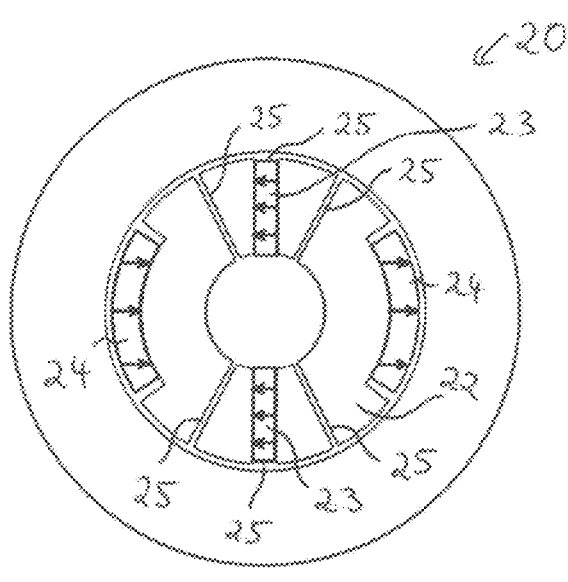

FIG. 16B shows a schematic cross-section through the electrical machine 20 according to another exemplary embodiment. Compared to the embodiment shown in FIG. 16A, no magnets 23 and no further magnets 24 are arranged in the recesses 25 in which the magnets 23 are arranged in FIG. 16A. For example, there is air in these recesses 25. In addition, the rotor 22 has two further recesses 25, in each of which a magnet 25 is arranged. This means that the magnets 23 and the further magnets 24 are arranged as shown in FIG. 10A. The rotor 22 thus has two magnetic pole pairs and three electromagnetic pole pairs.

Figure 17A:
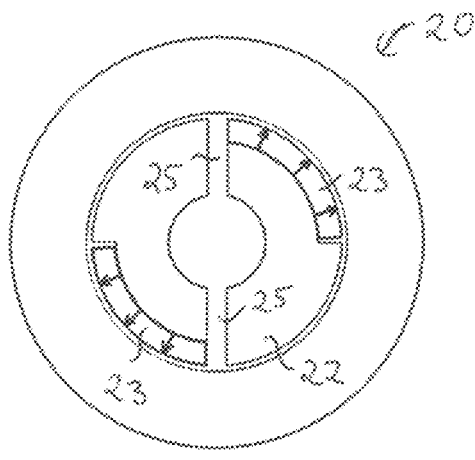

FIG. 17A shows a schematic cross-section through the electrical machine 20 according to another exemplary embodiment. Compared to the rotor 22 shown in FIG. 10A, no magnets 23 are arranged in the recesses 25 which extend parallel to a radial direction in a cross-section through the rotor 22. For example, air is present in the recesses 25 which extend parallel to a radial direction through the rotor 22. The magnets 23 are each arranged in recesses 25 which extend along the circumference of the rotor 22. The two magnets 23 each have the shape of a segment of a circle. Here, the two magnets 23 each extend over an angle of 90° along the circumference of the rotor 22. In this arrangement, each of the magnets 23 is adjacent to one of the recesses 25 which extend parallel to a radial direction through the rotor 22. The magnetic axes of the magnets 23 are each parallel to a radial direction. Furthermore, the magnetic axes of the magnets 23 point in opposite directions. That is, both magnetic axes point toward the air gap 26. The rotor 22 shown in FIG. 17A has no further magnets 24. Thus, the rotor 22 has one magnetic pole pair and two electromagnetic pole pairs.

Figure 17B:
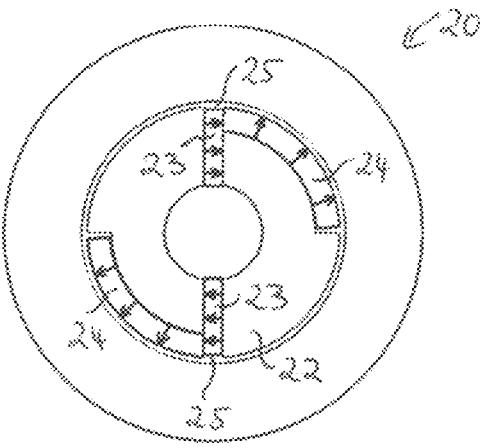

FIG. 17B shows a schematic cross-section through the electrical machine 20 according to another exemplary embodiment. Compared to the rotor 22 shown in FIG. 17A, a magnet 23 is arranged in each of the recesses 25 extending parallel to a radial direction. The magnets 23 are arranged as shown in connection with FIG. 10A, except that the magnetic axes of the magnets 23 point in opposite directions. Two further magnets 24 are arranged like the magnets 23 shown in FIG. 17A. The rotor 22 has two magnetic pole pairs and four electromagnetic pole pairs.

Figure 17C:
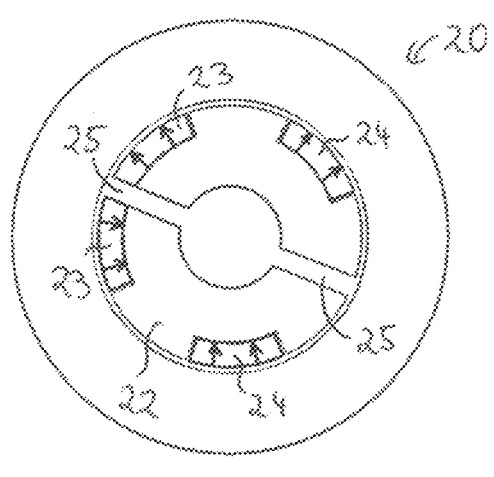

FIG. 17C shows a schematic cross-section through the electrical machine 20 according to another exemplary embodiment. In the recesses 25, which extend parallel to a radial direction, no magnets 23 and no further magnets 24 are arranged. For example, there is air in these recesses 25. Two magnets 23 are arranged in recesses 25 which extend along the circumference of the rotor 22. The magnets 23 each have the shape of a segment of a circle. The magnets 23 are each disposed directly adjacent to one of the recesses 25 which extend parallel to a radial direction through the rotor 22. The magnetic axes of the magnets 23 are parallel to a radial direction and point in opposite directions. In addition, two further magnets 24 are arranged in recesses 25 in the rotor 22. The further magnets 24 extend in places along the circumference of the rotor 22, each having the shape of a segment of a circle. Each of the further magnets 24 is arranged along the circumference of the rotor 22 between a recess 25, which extends parallel to a radial direction through the rotor 22, and a magnet 23. The magnetic axes of the further magnets 24 point in different directions. The rotor 22 has two magnetic pole pairs and four electromagnetic pole pairs.

Figure 17D:
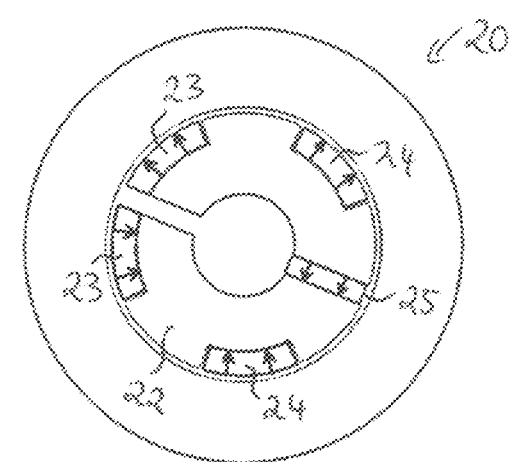

FIG. 17D shows a schematic cross-section through the electrical machine 20 according to another exemplary embodiment. Compared to the rotor 22 shown in FIG. 17C, a magnet 23 is arranged in one of the recesses 25. The magnet 23 is arranged in that recess 25 which extends parallel to a radial direction, and to which no magnets 23 are directly adjacent. The magnetic axis of the magnet 23 in this recess 25 is perpendicular to a radial direction. The rotor 22 has four electromagnetic pole pairs.

Figure 17E:
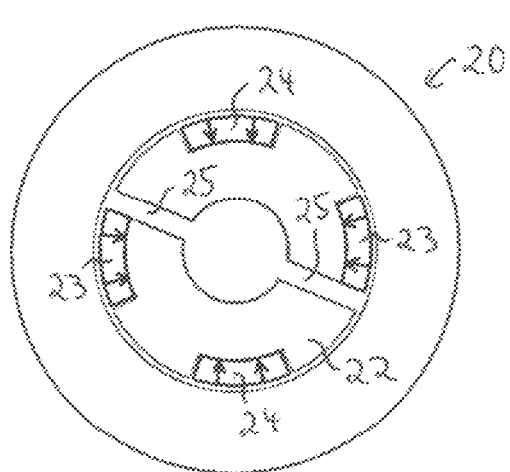

FIG. 17E shows a schematic cross-section through the electrical machine 20 according to a further embodiment. Compared to the rotor 22 shown in FIG. 17C, the magnets 23 and the further magnets 24 are distributed symmetrically along the circumference of the rotor 22. In this case, the magnets 23 are each directly adjacent to one of the recesses 25 in which no magnets 23 and no further magnets 24 are arranged. The magnets 23 are arranged offset by 180° relative to one another along the circumference of the rotor 22. The further magnets 24 are arranged to be offset by 180° with respect to each other along the circumference of the rotor 22. The magnets 23 are each arranged offset by 90° along the circumference of the rotor 22 relative to the further magnets 24. The magnetic axes of the magnets 23 and of the further magnets 24 each point toward the center of the rotor 22. The rotor 22 has two magnetic pole pairs and four electromagnetic pole pairs.

Figure 17F:
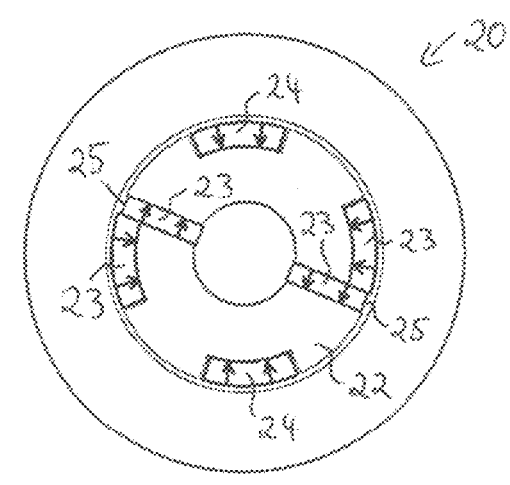

FIG. 17F shows a schematic cross-section through the electrical machine 20 according to another exemplary embodiment. Compared to the rotor 22 shown in FIG. 17D, one magnet 23 is arranged in each of the recesses 25 extending parallel to a radial direction through the rotor 22. The magnets 23 are arranged as shown in FIG. 10A, except that the magnetic axes of the magnets 23 point in opposite directions. The rotor 22 has three magnetic pole pairs and four electromagnetic pole pairs.

FIG. 18A shows a schematic cross-section through the electrical machine 20 according to another exemplary embodiment. In contrast to the rotor 22 shown in FIG. 10A, the further magnetic pole pairs are each formed by an electromagnet. For each further magnetic pole pair, the rotor 22 has two recesses 25. Electrical conductors 36 are arranged in each of the recesses 25. The electrical conductors 36 are designed to be supplied with electrical current. The electrical conductors 36 in two adjacent recesses 25 each form an electromagnet. For example, each electromagnet is formed by a coil. The electrical conductors 36 of a further magnet 24 are arranged offset from each other by less than 180° along the circumference of the rotor 22. The two further magnets 24 are arranged symmetrically with respect to the magnets 23 in cross-section through the rotor 22.

When the electromagnets are not energized, the rotor 22 has one magnetic pole pair and one electromagnetic pole pair (first operating state). If the electromagnets are supplied with current, the magnetic axis of the further magnets 24 can be adjusted by the current direction. If the magnetic axis of the further magnets 24 extends in the opposite direction compared to the magnetic axis of the magnets 23, this corresponds to the case shown with FIG. 2 (second operating state). In this case, the rotor 22 has three electromagnetic pole pairs. If the magnetic axis of the further magnets 24 extends in the same direction as the magnetic axis of the magnets 23, the rotor 22 has one electromagnetic pole pair and can be operated at a high magnetic flux density (third operating state). Thus, the setup shown in FIG. 18A allows three different operating states to be selected depending on requirements. Moreover, the number of electromagnetic pole pairs can be changed and adjusted during operation of the electrical machine 20. Furthermore, the magnetic flux density of the magnetomotive force of the rotor 22 at the air gap 26 can be changed and adjusted during operation of the electrical machine 20.

FIG. 18B shows a schematic cross-section through the electrical machine 20 according to a further exemplary embodiment. Compared to the embodiment shown in FIG. 18A, the magnets 23 are arranged like the further magnets 24 shown in FIG. 10A. The recesses 25 do not extend completely through the rotor 22. Electrical conductors 36 are arranged in two recesses 25, which are arranged 180° offset from each other along the circumference of the rotor 22. The electrical conductors 36 form the further magnet 24. The electrical conductors 36 are each arranged offset by 90° from the center of the magnets 23 along the circumference of the rotor 22. This embodiment can be operated as described with FIG. 18A.

FIG. 19A shows the distribution of the simulated magnetic flux density in the cross-section shown in FIG. 18A in the first operating state. In this case, the further magnets 24 are not energized. Thus, this is the first operating state. The rotor 22 exhibits one electromagnetic pole pair. In this operating state, the electrical machine 20 can be operated at high rotational speeds.

FIG. 19B shows the distribution of the simulated magnetic flux density in the cross-section shown in FIG. 18A in the second operating state. In this case, the further magnets 24 are supplied with current such that the magnetic axes of the further magnets 24 point in the opposite direction compared to the magnetic axes of the magnets 23. Thus, this is the second operating state. The rotor 22 has three electromagnetic pole pairs. In this operating state, the electrical machine 20 can be operated efficiently.

Figures 20A, 20B, 21A, 21B:
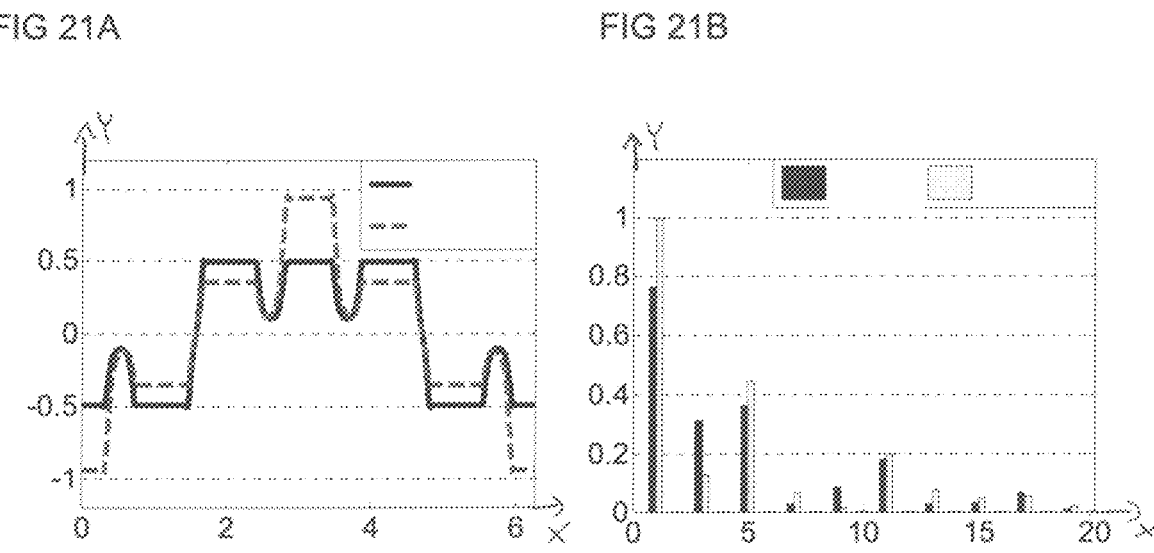

In FIG. 20A, the simulated magnetic flux density in the air gap 26 for the first operating state is shown with a solid line and for the second operating state with a dashed line. On the x-axis, the angle along the air gap 26 is plotted in radians. On the y-axis, the magnetic flux density is plotted in Tesla. In the second operating state, the rotor 22 has six electromagnetic poles.

In FIG. 20B, the simulated harmonic components of the magnetic flux density in the air gap 26 are plotted with black bars for the first operating state and with white bars for the second operating state. The order of the components is plotted on the x-axis. On the y-axis, the magnetic flux density is plotted normalized to 1. In the first operating state, the $1^{st}$ order component of the magnetomotive force of the rotor 22 is used to generate torque. In the second operating state, the $3^{rd}$ order component of the magnetomotive force of the rotor 22 is used for torque generation. In this case, since the ratio of the flux density of the $3^{rd}$ order component to the flux density of the $1^{st}$ order component is much larger than in the first operating state, the electrical machine 20 can be operated much more efficiently in the second operating state than in the first operating state.

In FIG. 21A, the simulated magnetic flux density in the air gap 26 is shown with a solid line for the first operating state and with a dashed line for the third operating state. On the x-axis, the angle along the air gap 26 is plotted in radians. On the y-axis, the magnetic flux density is plotted in Tesla. In the third operating state, a greater torque can thus be generated than in the first operating state.

In FIG. 21B, the simulated harmonic components of the magnetic flux density in the air gap 26 are plotted with black bars for the first operating state and with white bars for the third operating state. The order of the components is plotted on the x-axis. On the y-axis, the magnetic flux density is plotted normalized to 1. In the third operating state, the electrical machine 20 can be operated more efficiently than in the first operating state.

Figure 22A:
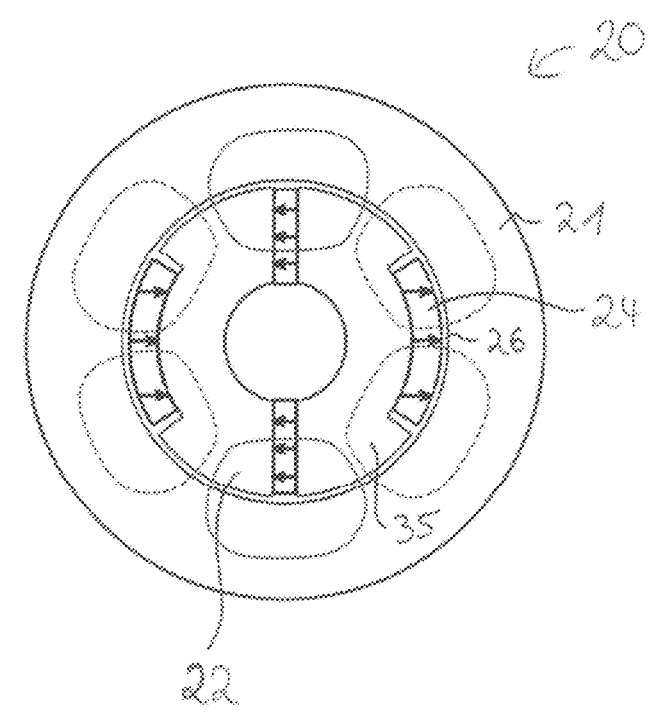

FIG. 22A shows a schematic cross-section through the embodiment of the electrical machine 20 shown in FIG. 10A. In the cross-section, the magnetic field lines of the magnetic flux density induced by the stator 21 during operation are shown. The flux density shown with solid lines extends along the air gap 26 through the rotor core 35. The flux density shown with dashed lines extends along the air gap 26 once through the rotor core 35 and once through one of the further magnets 24. This results in different magnetic flux densities of the different poles.

Figures 22B, 22C, 22D:
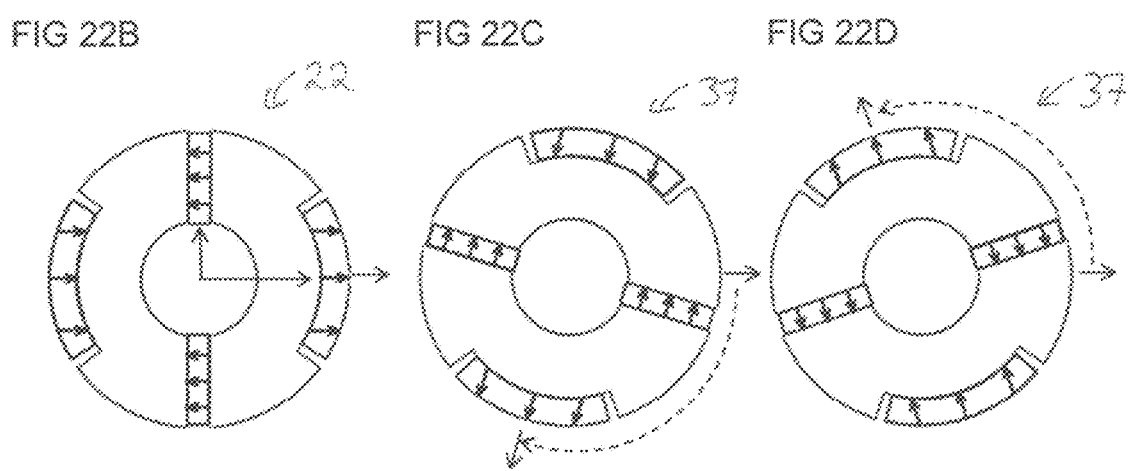

FIG. 22B shows a schematic cross-section through the rotor 22 shown in FIG. 22A. The arrow shown on the outside of the rotor 22 provides a reference point for the following two Figures.

In FIG. 22C, a schematic cross-section through a further rotor 37 is shown. The further rotor 37 has the structure shown in FIG. 22B. In addition, the further rotor 37 is rotated by an angle of 120° with respect to the rotor 22 shown in FIG. 22B. The arrows on the outside of the further rotor 37 show the 120° rotation. The 120° correspond to 360 electrical degrees.

FIG. 22D shows a schematic cross-section of a further rotor 37. The further rotor 37 has the structure shown in FIG. 22B. In addition, the further rotor 37 is rotated by an angle of 120° with respect to the further rotor 37 shown in FIG. 22C. The arrows on the outside of the further rotor 37 show the 120° rotation. This means that the further rotor 37 is rotated by 120° to the rotor 22 shown in FIG. 22B. The 120° correspond to 360 electrical degrees.

Figure 23A:
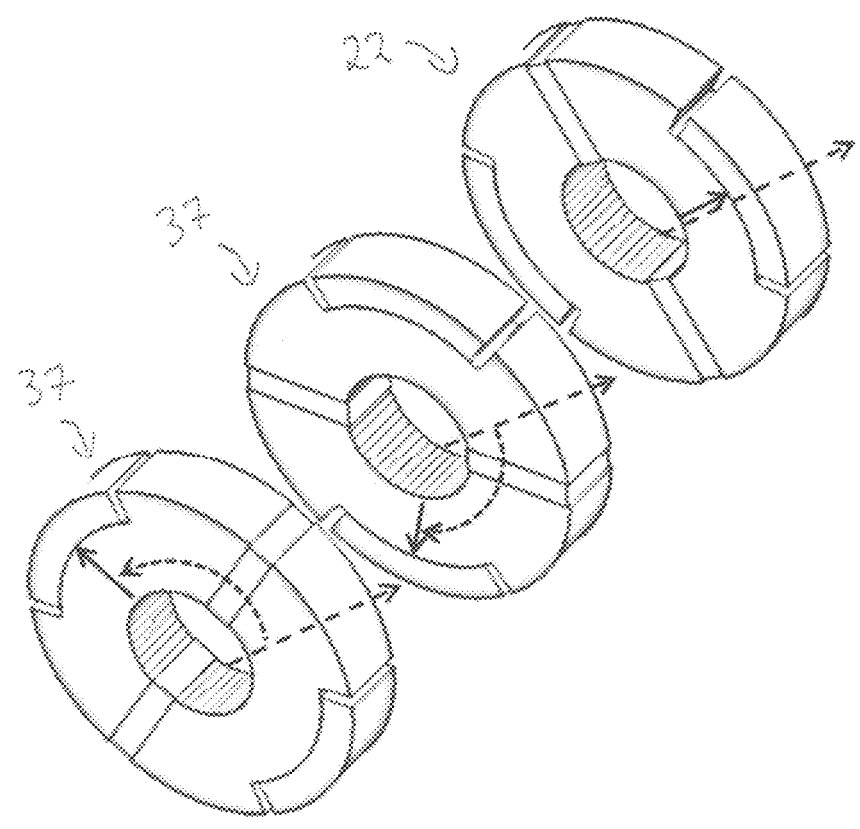

FIG. 23A shows the rotor 22 shown in FIG. 22B and the further rotors 37 shown in FIGS. 22C and 22D. The rotor 22 and the further rotors 37 are arranged along an axis. In addition, the rotors 22 and the further rotors 37 are each rotated by 120° relative to each other.

Figure 23B:
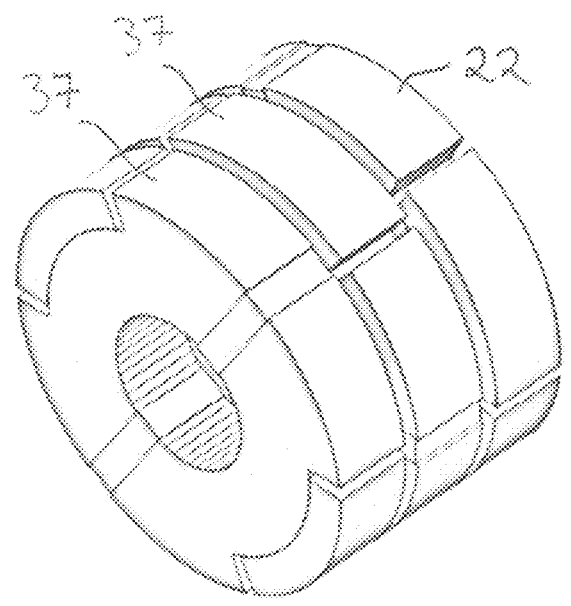

In FIG. 23B, the rotor 22 and the further rotors 37 of FIG. 23A are shown. The rotor 22 and the further rotors 37 may be arranged on a common shaft 34 in the electrical machine 20, which is not shown. The rotor 22 and the further rotors 37 may be arranged directly adjacent to each other as shown in FIG. 23B. Along the axis along which the rotor 22 and the further rotors 37 are arranged, the rotor 22 and the further rotors 37 have the same extension.

In FIG. 24A, a rotor 22 and a further rotor 37 are shown according to an exemplary embodiment. The rotor 22 and the further rotor 37 have the structure shown in FIG. 17A. The magnetic axes of the magnets 23 of the rotor 22 are parallel to a radial direction in the cross-section through the rotor 22. In this arrangement, the magnetic axes of the magnets 23 each point toward the outer surface 29 of the rotor 22. The magnetic axes of the magnets 23 of the further rotor 37 are parallel to a radial direction in the cross-section through the further rotor 37. Here, the magnetic axes of the magnets 23 each point toward the center of the further rotor 37. That is, the magnetic axes point away from the outer surface 29 of the further rotor 37. Thus, the rotor 22 and the further rotor 37 each have two electromagnetic pole pairs. The rotor 22 and the further rotor 37 are arranged along an axis in the electrical machine 20. The rotor 22 and the further rotor 37 may be arranged on a common shaft 34, which is not shown. Furthermore, the rotor 22 and the further rotor 37 are rotated by an angle of 90° with respect to each other. The 90° rotation is shown with arrows in FIG. 24A.

FIG. 24B shows the rotor 22 and the further rotor 37 of FIG. 24A. The rotor 22 and the further rotor 37 are arranged directly adjacent to each other in the electrical machine 20. Along the axis along which the rotor 22 and the further rotor 37 are arranged, the rotor 22 and the further rotor 37 have the same extension.

LIST OF REFERENCE NUMERALS

20: electrical machine
21: stator
22: rotor
23: magnet
24: further magnet
25: recess
26: air gap
27: insulating material
28: permanent magnet
29: outer surface
30: mounting
31: slot
32: stator winding
33: tooth
34: shaft
35: rotor core
36: electrical conductor
37: further rotor

The invention claimed is:

1. An electrical machine having a stator and a rotor mounted rotatable with respect to the stator, wherein the rotor comprises:
   at least two magnets; and
   at least four core poles of a rotor core;
   and
wherein:
   the magnets are permanent magnets;
   the rotor has at least two further magnets;
   the further magnets are permanent magnets;
   each further magnet forms a magnet pole;
   the further magnets have a same magnetization direction;
   the magnets have a same magnetization direction;
   the magnetization direction of the further magnets is opposite to the magnetization direction of the magnets;
each magnet is directly adjacent to two core poles of the rotor magnetic field along a circumference of the rotor;
   each further magnet is directly adjacent to two core poles along the circumference of the rotor; and
   an angle between the further magnets and is $360/p$ degrees, where p is a number of poles comprising a further magnet.

2. The electrical machine according to claim 1, in which a magnetic axis of the magnets in a cross-section through the rotor is perpendicular to a radial direction.

3. The electrical machine according to claim 1, in which a magnetic axis of the magnets in a cross-section through the rotor is perpendicular to a radial direction and in which a magnetic axis of the further magnets in a cross-section through the rotor is not perpendicular to a radial direction.

4. The electrical machine according to claim 1, in which two recesses extend at least partially through the rotor parallel to a radial direction in a cross-section through the rotor.

5. The electrical machine according to claim 4, in which the magnets are each arranged in one of the recesses of the rotor.

6. The electrical machine according to claim 4, in which an insulating material, which is not magnetic, is arranged in the recesses.

7. The electrical machine according to claim 1, in which a main direction of an extension of the magnets in a cross-section through the rotor extends in a radial direction.

8. The electrical machine according to claim 1,
   wherein the rotor is a first rotor,
   wherein the electrical machine comprises at least one further rotor, and
   wherein the first rotor and the further rotor are arranged on a common shaft, are arranged along an axis, and are rotated by an angle of at least 45 electrical degrees relative to each other.

9. The electrical machine according to claim 1, wherein each of the further magnets is arranged in and partially fills a recess in the rotor.

10. The electrical machine according to claim 1, wherein the rotor comprises four recesses that are free of magnets and further magnets.

11. The electrical machine according to claim 1, in which an extension of the magnets or the further magnets along the circumference of the rotor is in each case less than 180 electrical degrees.

12. The electrical machine according to claim 1, wherein the magnet poles and the at least four core poles all exhibit a same magnetic flux density in an air gap between the stator and the rotor.

13. The electrical machine according to claim 1, wherein:
   the further magnets are arranged entirely within the rotor;
   the further magnets each have a shape of a rectangle in a cross-section through the rotor; and
   a main direction of extension of the further magnets is parallel to a main direction of extension of the magnets.

14. An electrical machine having a stator and a rotor mounted rotatable with respect to the stator, wherein the rotor comprises:
   at least two magnets; and
   at least four core poles of a rotor core, and
wherein:
   the magnets are permanent magnets;
   the rotor has at least four further magnets;
   the further magnets are permanent magnets;
   each two further magnets form a magnet pole;
   each magnet is directly adjacent to two core poles along a circumference of the rotor;
   the further magnets are arranged entirely within the rotor;
   the further magnets each have a shape of a rectangle in cross-section through the rotor; and
   two further magnets are each arranged in a form of a V in the rotor.

15. An electrical machine having a stator and a rotor mounted rotatable with respect to the stator, wherein the rotor comprises:
   at least two magnets; and
   at least six core poles of a rotor core, and
wherein
   the magnets are permanent magnets;
   the rotor has at least four further magnets;
   the further magnets are permanent magnets;
   each further magnet forms a magnet pole;
   the magnets have a same magnetization direction;
   each magnet is directly adjacent to two core poles along a circumference of the rotor; and
   each further magnet is directly adjacent to two core poles along the circumference of the rotor.

16. The electrical machine according to claim 15, wherein the rotor comprises at least eight core poles of the rotor core, and wherein the rotor has at least six further magnets.

17. The electrical machine according to claim 15, wherein the rotor comprises at least four magnets.

18. The electrical machine according to claim 17, wherein:

the magnets are arranged in recesses in the rotor;

the recesses each extend parallel to a radial direction in cross-section through the rotor;

two magnets each are arranged at opposite sides of the rotor;

magnetic axes of the magnets each extend perpendicular to a radial direction in cross section through the rotor; and the magnetic axes of each two magnets, which are arranged 180° offset from each other along the circumference of the rotor, enclose an angle of 180° with each other.

19. The electrical machine according to claim 15, wherein:

the rotor has four recesses that each extend parallel to a radial direction in cross-section through the rotor;

no magnets and no further magnets are arranged in the recesses; and each recess is directly adjacent to one magnet and one further magnet along the circumference of the rotor.

* * * * *